US012749121B2

(12) United States Patent
Srivastava et al.

(10) Patent No.: US 12,749,121 B2
(45) Date of Patent: *Sep. 29, 2026

(54) PORTFOLIO OPTIMIZATION AND TRANSACTION GENERATION

(71) Applicant: Chicago Mercantile Exchange Inc., Chicago, IL (US)

(72) Inventors: Nimisha Srivastava, Bareilly (IN); Gunjan Sharma, Kota (IN); Shadi Nasr, Brooklyn, NY (US); Fateen Sharaby, Fort Lee, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,934

(22) Filed: Sep. 19, 2024

(65) Prior Publication Data

US 2025/0014109 A1 Jan. 9, 2025

Related U.S. Application Data

(63) Continuation of application No. 18/140,278, filed on Apr. 27, 2023, now Pat. No. 12,125,105, which is a continuation of application No. 16/719,195, filed on Dec. 18, 2019, now Pat. No. 11,676,210.

(51) Int. Cl.

| | |
|---|---|
| ***G06Q 40/06*** | (2012.01) |
| ***G06F 16/22*** | (2019.01) |
| ***G06Q 40/12*** | (2023.01) |

(52) U.S. Cl.

CPC ............. *G06Q 40/06* (2013.01); *G06F 16/22* (2019.01); *G06Q 40/12* (2013.12)

(58) Field of Classification Search

None

See application file for complete search history.

(56) References Cited

U.S. PATENT DOCUMENTS

| | | | | |
|---|---|---|---|---|
| 6,167,378 | A | 12/2000 | Webber, Jr. | |
| 6,438,734 | B1 | 8/2002 | Lu | |
| 7,149,720 | B2 * | 12/2006 | Shepherd | G06Q 40/04 705/37 |

(Continued)

OTHER PUBLICATIONS

Bialek et al., "Tracing based transmission pricing of cross-border trades: fundamentals and circular flows", IEEE Bologna Power Tech Conference Proceedings, vol. 3, 8 pages, 2003.

(Continued)

*Primary Examiner* — Paul S Schwarzenberg

(74) *Attorney, Agent, or Firm* — Lempia Summerfield Katz LLC

(57) ABSTRACT

A computer implemented method and associated hardware provides optimization of a delivery or settlement process for a group of portfolios. Data records, identified in a portfolio data structure, are indicative of obligations between participants. A graph data structure is generated and includes vertex data records representing the participants and edge data records representing the obligations between participants. The graph structure is analyzed for at least one circular path. A first edge washing out at least a portion of the circular path is identified. An update message is generated in response to the first edge.

20 Claims, 18 Drawing Sheets

(56) References Cited

U.S. PATENT DOCUMENTS

| | | | | |
|---|---|---|---|---|
| 7,831,491 | B2 | 11/2010 | Newell et al. | |
| 8,249,962 | B1 * | 8/2012 | Stephens | G06Q 40/06 705/35 |
| 8,442,904 | B2 * | 5/2013 | Milne | G06Q 40/00 705/37 |
| 8,615,462 | B2 * | 12/2013 | Glodjo | G06Q 20/10 705/37 |
| 9,710,593 | B1 | 7/2017 | Keller | |
| 10,504,177 | B2 * | 12/2019 | Weber | G06Q 40/04 |
| 2005/0091025 | A1 | 4/2005 | Wilson et al. | |
| 2005/0096999 | A1 | 5/2005 | Newell et al. | |
| 2005/0131798 | A1 | 6/2005 | Eisler et al. | |
| 2006/0173761 | A1 * | 8/2006 | Costakis | G06Q 40/04 705/35 |
| 2009/0171824 | A1 | 7/2009 | Glinberg | |
| 2010/0131383 | A1 | 5/2010 | Raghavan | |
| 2011/0035307 | A1 | 2/2011 | Kinnear | |
| 2015/0262299 | A1 * | 9/2015 | Crowley | G06Q 40/04 705/37 |
| 2018/0108086 | A1 | 4/2018 | Jang | |
| 2019/0102736 | A1 * | 4/2019 | Hudson | G06Q 20/065 |
| 2019/0251123 | A1 * | 8/2019 | Yamane | G06F 16/2458 |

OTHER PUBLICATIONS

Danko et al., "Portfolio Creation Using Graph Characteristics", Investment Management and Financial Innovations, vol. 15, No. 1, pp. 180-189, Feb. 22, 2018.

European Examination Report from EP Application No. 19215393. 0, May 7, 2024, EP.

Examination Report from European Patent Application No. 19 215 393.0, dated Jun. 23, 2023, 8 pages.

Extended European Search Report in European Application No. 20212672, dated May 3, 2021, 7 pages.

Extended European Search Report, from EP Application No. 19215393, Mar. 9, 2020, EP.

M. Vukasovic, M. Apostolovic and C. Todem, "Implementation aspects of partial netting in flow-based auction clearing mechanism," 2008 5th International Conference on the European Electricity Market, 2008, pp. 1-6, doi: 10.1109/EEM.2008.4579026. (Year: 2008).

Notice of Allowance from U.S. Appl. No. 16/234,091, dated Aug. 9, 2022, 15 pages.

Notional. (2006). In P.H. Collin (Ed.), Dictionary of business (4th ed). A&C Black. Credo Reference: https://search.credoreference.com/content/entry/acbbusiness/notional/0?institutionId=743 (Year:2006).

Notional. (2016). In Editors of the American Heritage Dictionaries (Ed), The American Heritage (R) dictionary of the English language (6th ed). Houghton Mifflin. Credo Reference: https://search.credoreference.com/content/entry/hmdictenglang/notional/0?institutionId=743 (Year 2016).

Rotemberg et al., "Minimal Settlement Assets in Economies with Interconnected Financial Obligations", Journal of Money, Credit and Banking, vol. 43, No. 1, pp. 81-108, Feb. 1, 2011.

* cited by examiner

PORTFOLIO OPTIMIZATION AND TRANSACTION GENERATION

RELATED APPLICATIONS

This application claims priority to and is a continuation of U.S. patent application Ser. No. 18/140,278, filed Apr. 27, 2023, entitled PORTFOLIO OPTIMIZATION AND TRANSACTION GENERATION, which claims priority to and is a continuation of U.S. patent application Ser. No. 16/719,195, filed Dec. 18, 2019, entitled PORTFOLIO OPTIMIZATION AND TRANSACTION GENERATION, the entirety of each of which being incorporated by reference herein and relied upon.

BACKGROUND

Marketplaces may include different types of markets such as over the counter (OTC) or exchanges. These markets operate to provide a mechanism for a buyer and seller to agree on a transaction. Trades that occur directly between a buyer and seller are called over-the-counter (OTC). These trades are not facilitated by a major exchange. In an OTC transaction, the price may be based on spot, or a future price/date. In an OTC transaction the terms are not necessarily standardized and, therefore, may be subject to the discretion of the buyer and/or seller. As with exchanges, OTC stock transactions are typically spot trades, while futures or forward transactions are often not spot.

The OTC is a decentralized market, without a central physical location, where market participants trade with one another through various communication modes such as the telephone, email, and proprietary electronic trading systems. An OTC market and an exchange market are the two basic ways of organizing financial markets. In an OTC market, dealers act as market-makers by quoting prices at which they will buy and sell a security, currency, or other financial products. A trade can be executed between two participants in an OTC market without others being aware of the price at which the transaction was completed.

An exchange market provides one or more markets for the purchase and sale of various types of products including financial instruments such as stocks, bonds, futures contracts, options, currency, cash, and other similar instruments. For example, a futures contract provides a mechanism to buy or sell a particular commodity or tradeable object (an underlying component) at a predetermined price at a specified time in the future. A spot or cash market is where financial instruments, such as commodities and securities, are traded for immediate delivery. Delivery is the exchange of cash for the financial instrument. Some users buy (or sell) instruments or commodities because they wish to obtain (or deliver) the underlying tradeable object at the price and time specified in the standardized contract. However, other users buy (or sell) instruments or commodities with the sole intention to sell (or buy) the instruments or commodities to earn profits based on a price movement.

There are three ways to close a position in a market. Offsetting contracts through liquidation is by far the most popular. Other methods include cash settlement (in index or interest rate markets) or physical delivery (in hard asset markets). Liquidation—(also called an "offset" or a "reversing trade:)—completes a transaction by bringing an investor's net position back to zero. Back to zero means that, if a participant has purchased a specific number of contracts for a specific commodity, for delivery on a specific date, the participant has sold the same number of contracts for the same commodity for the same delivery date. If, for example, instead, the participant shorted ten March iron ore contracts, then the participant must buy ten March iron ore contracts to offset the position. Typically, the counterparty for the reversing trade is going to be a different participant than the counterparty for the initial trade. If the reversal is not precisely matched though, the effect is that the participant enters into a new obligation instead of canceling out the old one.

Physical delivery may also be used to close a position. Typically, contracts state that the transaction is complete when the underlying commodity is physically delivered. The delivery workflow is a manual process that is inefficient, redundant, lacks uniformity, and is challenged by delays, slowness, arbitration, and disputes. In an example of the delivery process, the date and location of the drop-off may be specified in the contract and governed by the rules of the exchange. A "warehouse receipt" then certifies possession of a commodity in a licensed warehouse that is recognized for delivery purposes by an exchange. A short position holder must be prepared to deliver the underlying commodity. The delivery instrument for certain futures may either be a shipping certificate or a warehouse receipt. Only warehouses approved by the exchange can register and deliver these certificates or receipts. Therefore, a short position holder looking to deliver must be an approved warehouse or already own a certificate or receipt previously registered by an approved warehouse. A long position holder must be prepared to take delivery of the commodity and pay the full value of the underlying futures contract. The long position holder receives either a warehouse receipt or a shipping certificate which entitles them to obtain the physical commodity from an approved warehouse.

DETAILED DESCRIPTION

Figure 1:
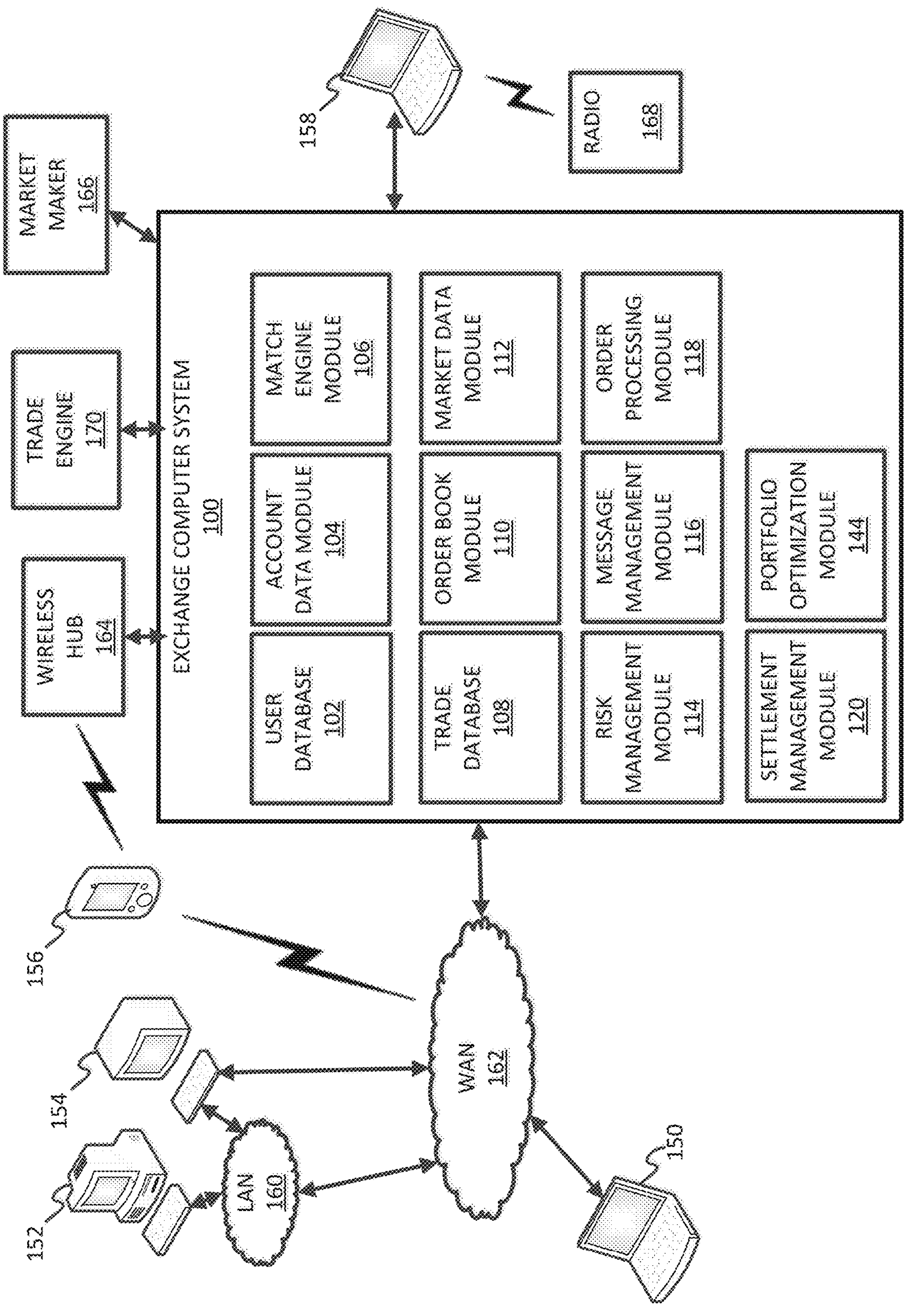
FIG. 1 depicts a computer network system, according to some embodiments.

The disclosed embodiments relate generally to a method for optimizing portfolios from market participants so that the delivery process is efficient. The system generates a graph that depicts all the obligations in the portfolios between market participants. Market participants are represented by vertices, and obligations are represented as connections between vertices. The system identifies trade circles and washes in the combined portfolio for at least a subset of participants. The system generates a plan to eliminate the circular obligations and washes by netting out obligations between multiple participants over the entirety of the portfolios. In addition, after the circular obligations and washes have been eliminated, additional simplifications may be obtained through suggesting trades for the participants. For example, the system may identify a potential circular obligation that is missing one trade or position that would net out two or more other obligations, which further optimizes the portfolios and improves the efficiency of the delivery process.

Embodiments include a multilateral trade and/or post-trade that is run prior to contract delivery, producing optimized “positions” for each participant in the ecosystem. Each participant, in a proposed circle determined by the algorithm, removes at least two non-essential-for-delivery position without going through the manual hardship of determining and finding circles. Thus, the algorithm finds the solutions automatically without any manual processes. In turn, the algorithm may add efficiency and reduce cost for physical trading lifecycle; additionally, it provides access to a greater number of participants to reenter the market for true price discovery and greater liquidity.

In general, a contract gives a contract holder an obligation to make or take physical delivery of an associated commodity or underlying asset (e.g., corn, wheat, gold, etc.) under the terms of the contract. Both parties of a contract must fulfill the terms of contract on the settlement date. The seller delivers the underlying asset to the buyer. The buyer pays the seller for the underlying asset. Generally, physical delivery of commodities includes taking delivery of basic resources such as crude oil, etc., agricultural products such as sugar, coffee beans, soybeans, rice, wheat, corn, soybeans, etc. and metals such aluminum, gold, silver, etc. An actual physical commodity is delivered at the completion of a contract, as opposed to a futures contract on that physical commodity.

A contract may specify the number of units of the commodity that must be delivered, and also the specific delivery terms and features of the commodity. For example, a November soybean futures contract that expires in November means that someone will be physically delivering 5,000 bushels of soybeans and someone will be taking physical delivery of the 5,000 bushels of soybeans at a grain elevator in a predetermined location (e.g., city and state). Physical delivery of commodities typically occurs to/from farmers, food processors, consumer product manufacturers, industrial product manufacturers, energy providers, airlines, financial institutions, etc. These parties actually use the physical commodities to produce, manufacture and sell many different types of goods and services.

Physically delivered products undergo a complex delivery process where positions/obligations are transferred across multiple parties. Typically, several weeks before the delivery date, each participant contacts one another to quantify the obligations from between the two participants. At this time, obligations between the two participants may be negotiated and aggregated. Certain obligations may be washed out between the two participants or combined. Other details regarding the delivery process may also be discussed.

The manual process of netting and aggregation, however, is inefficient and fails to optimize the portfolios of the participants. As there are tens, hundreds, or thousands of participants in each market, the manual process may be unable to identify circular obligations or provide efficient netting. In an anonymized central clearing party based electronic trading system, the participants may not know each other and therefore may not be able to contact one another. Only a centralized trading system is privy to all of the participant’s portfolios and is, therefore, in the position to conduct the disclosed analysis. In addition, the process must be repeated constantly for tens, hundreds, or thousands of obligations. Any outcome that is less than optimal generates massive quantities of waste. For example, a circular obligation between five different participants that is not identified may result in, not one, but five extraneous deliveries that could have been avoided.

Embodiments provided herein simplify the delivery process by providing a system that results in less paperwork to all participants, improved efficiency, and lower cost across the entire ecosystem. The embodiments herein reduce the number of contracts between participants. This reduces the number of communications necessary to manage, monitor and manage the transactions (e.g., this is an improvement in the bandwidth of the system). With fewer transactions, computing resources are conserved. A centralized source of calculation for the final state of the obligations between participants is generated. An extendible application ecosystem may be built around methodology to support a wide array of similar application of transactions. The increased efficiency and lower cost may lead to an increase in liquidity for the markets through trade optimizations. Reducing back office cost associated with time and effort dedicated to locating and settle circles may encourage previously active participants to reenter a market that has historically been laden with operational inefficiency and complexity.

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. Input electronic data transaction request messages may be received from different client computers over a data communication network, and output electronic data transaction result messages may be transmitted to the client computers and may be indicative of results of the attempts to match incoming electronic data transaction request messages. The specifically configured matching processors may additionally generate information indicative of a state of an environment (e.g., the state of the order book) based on the processing of the electronic data transaction request messages and report this information to data recipient computing systems via outbound messages published via one or more data feeds that contain electronic data transaction result messages. While the disclosed embodiments may be described with respect to electronic data transaction request and result messages, it will be appreciated that the disclosed embodiments may be implemented with respect to other technologies later developed, such as photonic, e.g., light-based, messages.

For example, one exemplary environment where the disclosed embodiments may be desirable is in financial markets and, in particular, electronic financial exchanges, such as in an OTC market or an exchange, such as the Chicago Mercantile Exchange Inc. (CME).

I. Over the Counter Market

An over the counter market (OTC) provides one or more markets for the purchase and sale of various types of products including financial instruments such as stocks, bonds, futures contracts, options, currency, cash, and other similar instruments. Agricultural products and commodities are also examples of products traded on such markets.

One example of an OTC is the Paranagua marketplace. The downsides of an OTC market may lead to reduced price transparency and price discovery as transaction information is not universally shared. Increased operational cost, lack of scale, delayed deliveries, and an overall inefficient documentation process lead to a less efficient marketplace.

The Paranagua's market, for example, is a heavily brokered market where brokers control each aspect of the existing execution-to-delivery processes. Trading is not executed electronically but rather is executed via voice trading. With the absence of a clearing facility in the market, executed positions build exceptionally long strings, circular and offsetting positions that create operational workload to back offices at various firms. Removal of positions that are non-essential (cash settled) to delivery is cumbersome. The current process include two primary steps, that of removing circular obligations via cash settlement and shortening strings via cash settlement.

II. Exchange Computing System

An exchange may also provide one or more markets for the purchase and sale of various types of products including financial instruments such as stocks, bonds, futures contracts, options, currency, cash, and other similar instruments. Agricultural products and commodities are also examples of products traded on such exchanges A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

A financial instrument trading system, such as a futures exchange, such as the CME, provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. Clearing is the procedure through which the clearing house becomes buyer to each seller of a futures contract, and seller to each buyer, also referred to as a novation, and reduces risk of financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system interposes itself into the transactions between the market participants, i.e., splits a given transaction between the parties into two separate transactions where the exchange computing system substitutes itself as the counterparty to each of the parties for that part of the transaction. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine, which may also be referred to herein as a module or match/matching engine processor, within an exchange trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

The disclosed embodiments may be implemented by an exchange computing system to generate a new type of financial instrument that closely tracks a futures contract based on historical settlement prices of the futures contract, which may be traded on the exchange computing system.

III. Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell that product. As such, as used herein, an order book for a product may also be referred to as a market for that product.

IV. Electronic Data Transaction Request/Result Messages and Market Data Feeds As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

V. Matching and Transaction Processing

Market participants, e.g., traders, use software to send orders or messages to the trading platform. The order identifies the product, the quantity of the product the trader wishes to trade, a price at which the trader wishes to trade the product, and a direction of the order (whether the order is a bid, i.e., an offer to buy, or an ask, i.e., an offer to sell). It will be appreciated that there may be other order types or messages that traders can send including requests to modify or cancel a previously submitted order.

As was described above, the exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

VI. Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house also manages the delivery process.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants relatively quickly. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as "settlement variation", is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Clearing houses, like the CME clearing house may specify the conditions of delivery for the contracts they cover. The exchange designates warehouse and delivery locations for many commodities. When delivery takes place, a warrant or bearer receipt that represents a certain quantity and quality of a commodity in a specific location changes hands from the seller to the buyer who then makes full payment. The buyer has the right to remove the commodity from the warehouse or has the option of leaving the commodity at the storage facility for a periodic fee. The buyer could also arrange with the warehouse to transport the commodity to another location of his or her choice, including his or her home, and pays any transportation fees. In addition to delivery specifications stipulated by the exchanges, the quality, grade, or nature of the underlying asset to be delivered are also regulated by the exchanges.

The delivery process may involve several deadlines that are handled by the Exchange clearinghouse. Different commodities may include different parameters and timing for delivery. The first deadline of an example delivery process is called position day. This is the day that the short position holder in the market indicates to the exchange clearinghouse that the holder intends to make delivery on his futures position and registers a shipping certificate in the clearing delivery system. Also, starting on the first position day, each participant must report all of their open long positions to the clearinghouse. The clearinghouse ranks the long positions according to the amount of time they have been open and assigns the oldest long position to the short position holder that has given his intention to deliver.

At a second deadline, referred to as notice day, the short position holder and long position holder receive notification that they have been matched, and the long position holder receives an invoice from the clearinghouse. A third deadline is the actual delivery day. The long position holder makes payment to the clearinghouse, and the clearinghouse simultaneously transfers the payment from the long to the short position holder, and the shipping certificate is transferred from the short to the long position holder. Now the long position holder is the owner of the shipping certificate and the participant has several options. In an example of grain, the participant can hold the certificate indefinitely, but must pay the warehouse that issued the certificate storage charges, that are collected and distributed monthly by the clearing house. The participant can cancel the shipping certificate and order the issuing warehouse to load-out the physical commodity into a conveyance that he places at the issuing warehouse. The participant can transfer or sell the certificate to someone else. Or the participant can go back into the futures market and open a new position by selling futures, in which case he now becomes the short position holder. The participant may then initiate a new three-day delivery process, that would entail re-delivery of the warehouse certificate the participant now owns. During this time, the participant will continue to pay storage charges to the warehouse until he re-delivers the certificate.

As discussed herein, the disclosed embodiments may use the settlement prices, along with other market data for a target futures contract, to determine a tracking value. The value of a tracking financial instrument may be based on the tracking value, whereby trading the tracking financial instrument enables a trader to avoid many of the complications (e.g., computational, logistical, etc.) associated with trading a traditional futures contract.

VII. Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
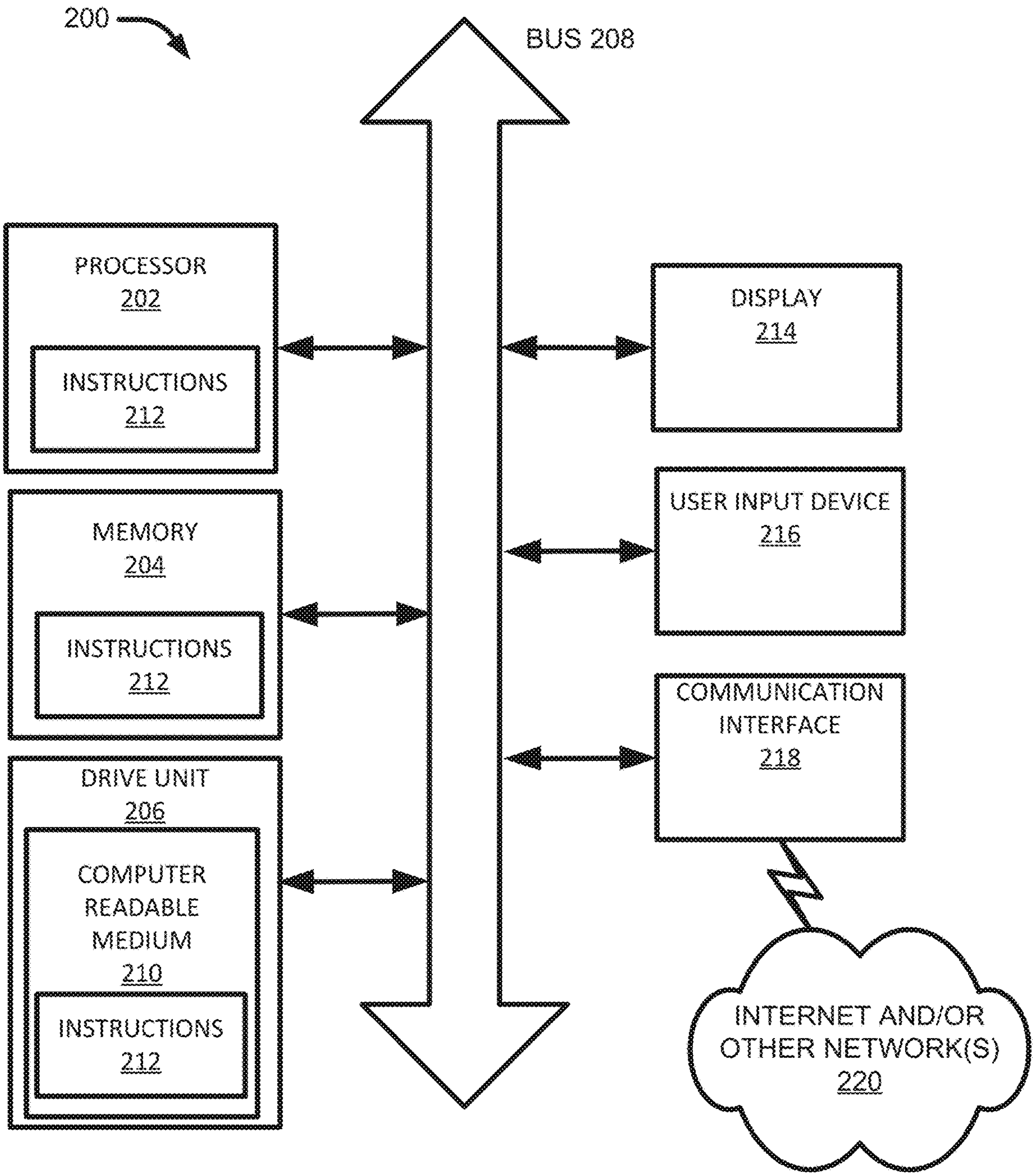
FIG. 2 depicts a computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory (ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

The portfolio optimization module 144 may assist in regulating the delivery or settlement process. The portfolio optimization module 144 is configured to receive portfolios from market participants and performs an optimization process on the portfolios so that the delivery process is optimized and simplified. The portfolio optimization module 144 generates a graph that depicts all the trades in the portfolios between market participants. Market participants are represented by nodes, and trades are represented as connections between nodes. The portfolio optimization module 144 is configured to receive a plurality of data files including portfolios for a plurality of market participants, the portfolios including information about the market participants and relationships therebetween. The settlement module 120 is configured to generate a graph based on the portfolios, wherein the market participants are represented by nodes and the relationships therebetween are represented by connections therebetween, the graph including a starting node and an ending node, determine circular connections between the starting and ending nodes, and eliminate at least some of the determined circulator connections.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination thereof. For example, the modules may be embodied as part of an exchange computer system 100 for financial instruments. It should be appreciated that the disclosed embodiments may be implemented as a different or separate module of the exchange computer system 100, or as separate computer system coupled with the exchange computer system 100 so as to have access to margin account records, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based computer device, or other wireless device, may communicate with the LAN 160 and/or the Internet 162 via radio waves, such as via WiFi, Bluetooth® and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is shown. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to the exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including, but not limited to, random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disc or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including, by way of example, a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functions as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms “microprocessor” or “general-purpose processor” (“GPP”) may refer to a hardware device that fetches instructions and data from a memory or storage device and executes those instructions (for example, an Intel Xeon® processor or an AMD Opteron processor) to then, for example, process the data in accordance therewith. The term “reconfigurable logic” may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term “software” may refer to data processing functionality that is deployed on a GPP. The term “firmware” may refer to data processing functionality that is deployed on reconfigurable logic. One example of a reconfigurable logic is an FPGA which is a reconfigurable integrated circuit. An FPGA may contain programmable logic components called “logic blocks”, and a hierarchy of reconfigurable interconnects that allow the blocks to be “wired together”, somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (“LAN”) and a wide area network (“WAN”), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

VIII. Portfolio Optimization

Typically, cash/spot market contracts state that the transaction is complete when the product is physically delivered. As the delivery date approaches, several bilateral financial and transactions delivery workflow undergo a complex negotiation process where obligations are transferred across multiple parties. The workflow is a manual process that is inefficient, redundant, and lacks uniformity, and is challenged by delays, slowness, arbitration, and disputes. The relationships and obligations between parties are often not discernable unless all the parties collaborate to determine each party’s obligations to each other. Because any one of the parties does not know how all the parties interact with each other, parties must perform a manual trade optimization. The current circle discovery process is based on back-offices’ efforts to discover participants in a potential circle via emails or phone calls. Each transaction may also be done directly between two parties without the supervision of an exchange.

Embodiments disclosed herein include an iterative search algorithm that is run prior to contract delivery. The iterative search algorithm calculates optimized “positions” for each participant in the system. Each participant, in an identified obligation circle determined by the iterative algorithm, removes non-essential for delivery position without the manual hardship of determining and finding circles. In turn, the algorithms add efficiency and reduce cost for physical trading lifecycle and provide access to a greater number of participants to reenter the market for true price discovery and greater liquidity.

The disclosed system identifies portfolios of market participants and automatically performs an optimization process on the portfolios so that the delivery process is optimized and simplified. The system generates a graph data structure that includes all the trades in the portfolios between market participants. Market participants are represented by vertices, and trades are represented as connections or edges between the vertices. The system optimizes the obligations between the participants so that certain obligations can be eliminated.

Figure 3:
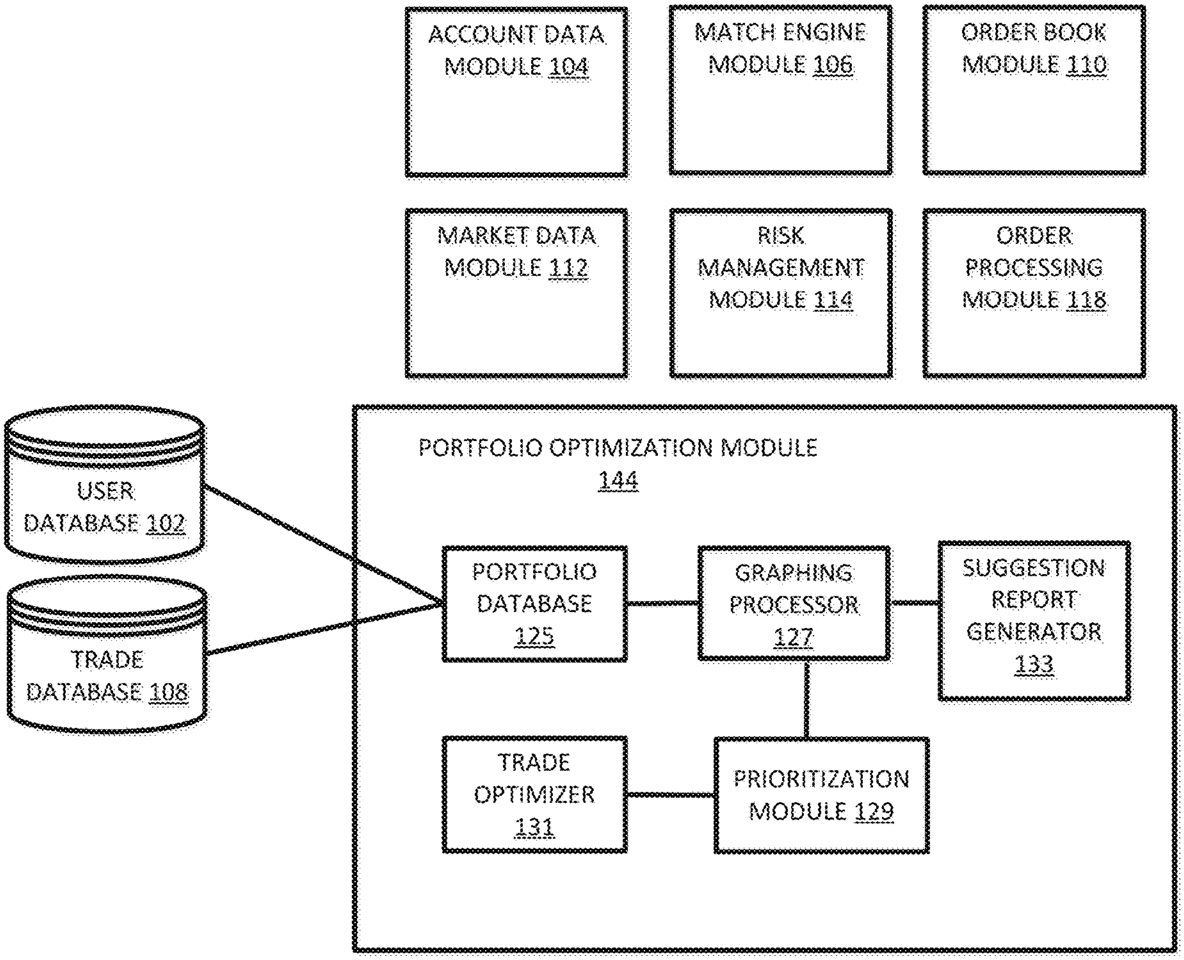
FIG. 3 depicts an example system architecture for optimizing a portfolio.

FIG. 3 depicts a system that includes a portfolio optimization module 144. As depicted, the portfolio optimization module 144 is configured as part of an exchange 100. The portfolio optimization module 144 may be a standalone module that operates in OTC or cash/spot markets. The portfolio optimization module 144 includes a portfolio database 125, a graphics processor 127, a trade optimizer module 131, and a prioritization module 129. In one embodiment, discussed in more detail below, the portfolio optimization module 144 also includes a suggestion report generator 133. The portfolio optimization module 144 may be configured to simplify the delivery or settlement process by providing a system that results in less paperwork to all participants, improved efficiency, and lower cost. A centralized source of calculation for the final state of the obligations between participants is generated. An extendible application may support a wide array of similar applications for transactions. The increased efficiency and lower cost may lead to an increase in liquidity for the markets through trade optimizations. Reducing back office cost associated with time and effort dedicated to identifying and settling circles may encourage previously active participants to reenter a market that has historically been laden with operational inefficiency and complexity.

The portfolio database 125 of the portfolio optimization module 144 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the portfolio database 125 to store one or more portfolios of a plurality of participants in the exchange computer system 100. The one or more portfolios include one or more obligations between participants to delivery quantities of a commodity to one another at a set date and place. The one or more obligations may include further attributes or parameters as defined by a contract that underlies the obligations. The portfolio database 125 may be configured to sort the one or more obligations into one or more groups of fungible obligations according to the contractual terms, e.g. that include the same commodity, shipment period, price, grade, shipment port, etc. The portfolio database 125 may derive the portfolios from the trade database 108 and the user database 102 of the exchange computer system 100 or may receive a list of obligations to be optimized from each of the participants. All or fewer than all of the participants may participate in the optimization. The portfolio database 125 may only include those portfolios and obligations for participants that opt to participate in the optimizations.

The graphics processor 127 of the portfolio optimization module 144 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the graphics processor 127 to generate a weighted directed graph of the plurality of obligations in the portfolio database 125 and identify all of the obligation circles or netting series in the weighted directed graph. The graphics processor 127 may be configured to generate distinct graphs for each different commodity or bucket of obligations identified by the portfolio database 125 as being fungible. For example, the graphics processor 127 may generate a separate graph for March corn deliveries and September corn deliveries. The graphics processor 127 may store the graph in a matrix form or in a database, for example, a relational database. The graphics processor 127 may be configured to identify the obligation circles or netting series by using the disclosed algorithm which is an iterative approach of visiting all possible neighbors. There is a cycle in a graph if there are edges present in the graph that form a series that begins and ends at the same node. The search is configured to identify trade circles and netting in the combined portfolio for all participants.

The algorithm involves an iterative process where each participant node is analyzed individually using a stack or a data structure that stores a plurality of data elements. A data element is added to the stack through a push operation. A data element is removed from the stack through a pop operation. Another data structure includes a matrix or array for the paths between the participant node. This data structure, which may be referred to as the path matrix, is used to track the iterative process of following the paths between nodes. The path matrix may be initiated to indicate that all paths are unvisited. For every participant V:

1. Visit neighbor node N, which is an unvisited vertex that is adjacent to participant V. Whether or not the vertex is visited may be determined from the path matrix. Mark the path between V and N as visited in the path matrix.
2. Push or add neighbor N in the stack.
3. For every neighbor repeat 1 and 2 until:
   a. The genesis node (the participant V in 1) is reached (i.e., a series is completed that begins and ends at the same node); OR
   b. No unvisited path is found (i.e., all of the paths have been traversed and marked as visited in the path matrix without a series that begins and ends at the same node being completed).
4. For 3a trace back the circle C for node V to define the series that begins and ends at the same node.
5. For 3a and 3b, pop up or remove a vertex from the stack. (It will pop up all the vertices from the stack, which do not have adjacent vertices to be visited yet.)
6. Mark the path between N and its neighbor as unvisited in the path matrix.
7. Repeat above steps until the stack is empty.

Once the obligation circles and netting are identified by the graphics processor 127, the prioritization module 129 may prioritize the identified circle and netting based on certain parameters. The prioritization module 129 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the prioritization module 129 to prioritized the identified circles and netting based on certain parameters. The prioritization module 129 is configured to, for every circle C identified by the graphics processor 127:

1. Calculate the path traversed for each circle.
2. Calculate maximum notional (e.g., quantity of the underlying asset) that can be optimized in the circle. The maximum notional may be defined as the smallest notional of each of the paths of the circle. The maximum notional may be defined as min(Q) where the array Q includes the quantities in C.
3. Start optimization with largest path. For example, determine a quantity of nodes in each of the circles C, and select the circle having the highest quantity of nodes.
   a. If multiple paths have the same path length, select the maximum notional among the optimizable notional of each circle. In other words, when two circles are tied for the highest quantity of nodes, select the circle with the higher maximum notional.

The trade optimization module 131 of the portfolio optimization module 144 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the trade optimization module 131 to alter one or more obligations of the plurality of obligations from the plurality of participant portfolios based on the identified obligation circles. The trade optimization module 131 is configured to eliminate current obligations or modify existing obligations. The optimization process may be performed as follows:

1. For each path within the circle:
   i. Update aggregated notional between two parties or for a path by reducing the optimizable notional.
2. Skip the circle optimization if aggregated notional for any path in circle is 0

After all circles/netting are traversed:

1. If the updated aggregated notional between two parties is 0

$$\sum_{k=1}^{n} \text{Notional}_{AB} = 0$$

then all of the obligations for the party pair (A, B) are marked for suggested removal.

2. If the updated aggregated notional is not 0 (e.g., "< >" represents "not equal to") and the same as the starting notional $$\sum_{k=1}^{n} \text{Notional}_{AB} <> 0$$

then, all of the obligations for the party pair (A,B) are marked as no change.

3. If the updated aggregated notional is not 0 and not the same as starting notional $$\sum_{k=1}^{n} \text{Notional}_{AB} <> 0$$

a. Then, amend obligations with lowest notional to reduce notional first.

b. If multiple obligations have the same notional, select obligation with a flat price (e.g., initial price) followed by basis price (e.g., variable component of the price to be determined nearer to the time of delivery according to one or more predetermined factors).

c. The obligation is marked as modification/suggested removal.

d. The remaining obligations for the party pair are marked as no change.

The portfolio optimization module 144 may be further configured to generate one or more reports for the participants. The portfolio optimization module 144 may be configured to generate a trade optimization report indicating the optimized status of each proposed trade in portfolio and a trade settlement report indicating the cash settlement amount for each proposed trade.

Figure 4:
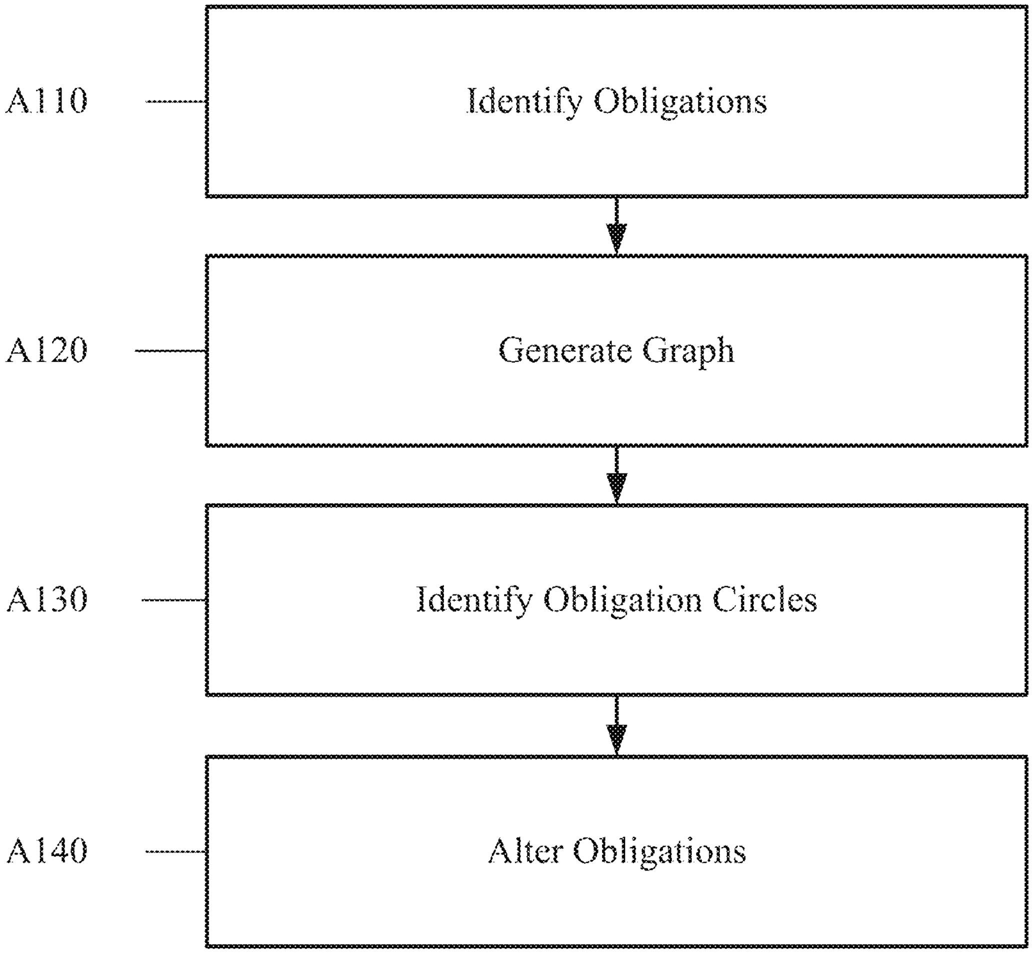
FIG. 4 depicts an example flowchart for optimizing a portfolio.

FIG. 4 depicts a method for optimizing a plurality of participant portfolios as may be implemented with computer devices and computer networks, such as those described with respect to FIG. 1, 2, or 3. Embodiments may involve all, more or fewer actions indicated by the blocks of FIG. 4. The actions may be performed in the order or sequence shown or in a different sequence.

At act A110, a plurality of obligations is identified between participants from the plurality of participant portfolios. Obligations refer to terms and obligations agreed to in contracts between the participants. The buyer of the contract agrees to deliver the product at the time specified. Additional conditions may specify the grade or the product, the shipment period, the price (basis vs. flat), the delivery location, etc. The specified time in future which is when delivery and payment occur is known as the delivery date.

Table 1 below depicts an example portfolio for a market participant A. Table 1 lists the trade identifier, the product, the buyer, the seller, and the quantity. Since this is a portfolio for a single participant, A is always either the buyer or the seller. The information in Table 1 is the information available to a single participant.

TABLE 1

| Trade Id | Product | Buyer | Seller | Qty |
|---|---|---|---|---|
| T1 | Corn | A | B | 4 |
| T4 | Corn | D | A | 10 |
| T5 | Corn | A | E | 20 |
| T13 | Corn | D | A | 15 |
| T14 | Corn | A | D | 25 |
| T16 | Corn | E | A | 25 |
| T17 | Corn | A | B | 6 |
| T18 | Corn | A | E | 3 |
| T22 | Soy | A | B | 10 |
| T25 | Soy | A | C | 15 |
| T27 | Soy | F | A | 25 |
| T29 | Soy | G | A | 40 |
| T35 | Oilseed | A | C | 12 |
| T39 | Oilseed | A | G | 15 |
| T44 | Oilseed | B | A | 18 |
| T50 | Oilseed | C | A | 9 |
| T56 | Oilseed | A | E | 27 |
| T57 | Oilseed | A | F | 15 |
| T63 | Oilseed | A | I | 18 |
| T71 | Oilseed | D | A | 21 |

The information stored in the table may be stored by the market participant. The market participant may have access to their own portfolio but may not have access to other participants' portfolios. A party, however, may act as a neutral optimization venue and have access to each portfolio. In an embodiment, the optimization venue may receive data from different participants and store it for optimization purpose.

In Table 1, the portfolio contains multiple different products (contracts) with different specifications. For example, the participant A may have an obligation to deliver 10 units of corn to D (Trade id T4). Likewise, A as the buyer may expect delivery of 4 units of corn from B. A as a party to both obligations can track both trades. Participant B, however, may be unaware of the obligations between A and D and vice versa.

In a preprocessing step, the portfolios submitted by participants may be bucketed or sorted to different optimization groups based on the contract specification. Bucketing includes separating the obligations by their attributes. The buckets may be predetermined based on a prior delivery specification. For example, certain ports or shipment periods may be determined to be interchangeable and as such may both be in the same bucket. Other attributes, such as date may be less flexible and as such may be assigned different buckets. Some of the attributes for sorting the buckets may sorted on include: product/commodity code, shipment period, shipment port, etc. In the example of Table 1 described above, the product is listed generally, however each trade may involve different periods, grade, ports, etc.

Table 2 below describes a bucket of obligations detailing 18 different trades between participants A, B, C, D, E, F, G, H, and I. The information in Table 2 is identified from multiple different portfolios such as the example portfolio of A described above and the additional portfolios of B, C, D, E, F, G, H, and I.

TABLE 2

| Trade Id | Buyer | Seller | Qty |
|---|---|---|---|
| T1 | A | B | 4 |
| T2 | B | C | 10 |
| T3 | C | D | 20 |
| T4 | D | A | 10 |
| T5 | A | E | 20 |
| T6 | E | F | 10 |
| T7 | F | G | 15 |
| T8 | G | H | 30 |
| T9 | H | I | 30 |
| T10 | I | J | 30 |
| T11 | J | G | 30 |
| T12 | C | D | 40 |
| T13 | D | A | 15 |
| T14 | A | D | 25 |
| T15 | G | I | 10 |
| T16 | E | A | 25 |
| T17 | A | B | 6 |
| T18 | A | E | 3 |

There may be tens, hundreds, or thousands of different buckets. There may be tens, hundreds, or thousands of different participants and portfolios. Each bucket may thus contain anywhere from a few to several thousand different obligations between different participants.

For each obligation there may be two or more participants involved. As such, when identifying obligations, the system identifies the obligation on each of the participants' portfolios. For example, if the portfolio of participant A lists an obligation to participant B, then the portfolio of participant B should also list the same obligation on the receiving side. A check may be run across all the portfolios to determine that each obligation is valid. In an embodiment, the optimization venue may not have access to each portfolio. For example, one participant may opt out of the optimization program and thus make their portfolio private. In this scenario, the system would exclude the obligation from optimization. If additional participants opt out, the optimization venue may still optimize the obligations of the portfolios that it has access to.

At act A120, a directed graph is generated with the plurality of obligations. A directed graph is generated for each commodity and/or bucket. In the directed graph, participants are represented by vertices and obligations are represented as edges. A directed graph is a graph that is a set of vertices connected by edges, where the edges have a direction associated with them. The edges may also have a weight associated with them. The vertices represent participants and the edges represent obligations. The weights of the edges represent quantities of the obligations. For example, in a simple directed graph that includes two vertices (two participants) a line (edge) is drawn between the two vertices with a direction (e.g. to whom the obligation is to) with a weight (indicating a value, for example quantity).

To generate a directed weighted graph, the obligations may be aggregated. In the example of Table 2, Participant A has two obligations T1 and T17 to Participant B. The two obligations may be combined to generate a single obligation from Participant A to Participant B for 10 units. Additionally, netting trades may be identified. Here the term netting refers to some quantity of an obligation that may be directly zeroed out between two parties. For example, if Participant X is obligated to deliver 10 units to Participant Y and Participant Y is obligated to delivery 6 units to Participant X then the 6 units may be "netted" out, leaving only an obligation for Participant X to delivery 4 units to Participant Y. Trade netting is easier to identify and remove as all the information resides with a single party. In the example, above, Participant X can identify the trade net without any external data. Trade netting may be identified and removed prior to the optimization process, for example when the trades are performed. Trade netting may be considered an attempt to settle early and as such may not be relevant to the delivery process.

Figure 5A:
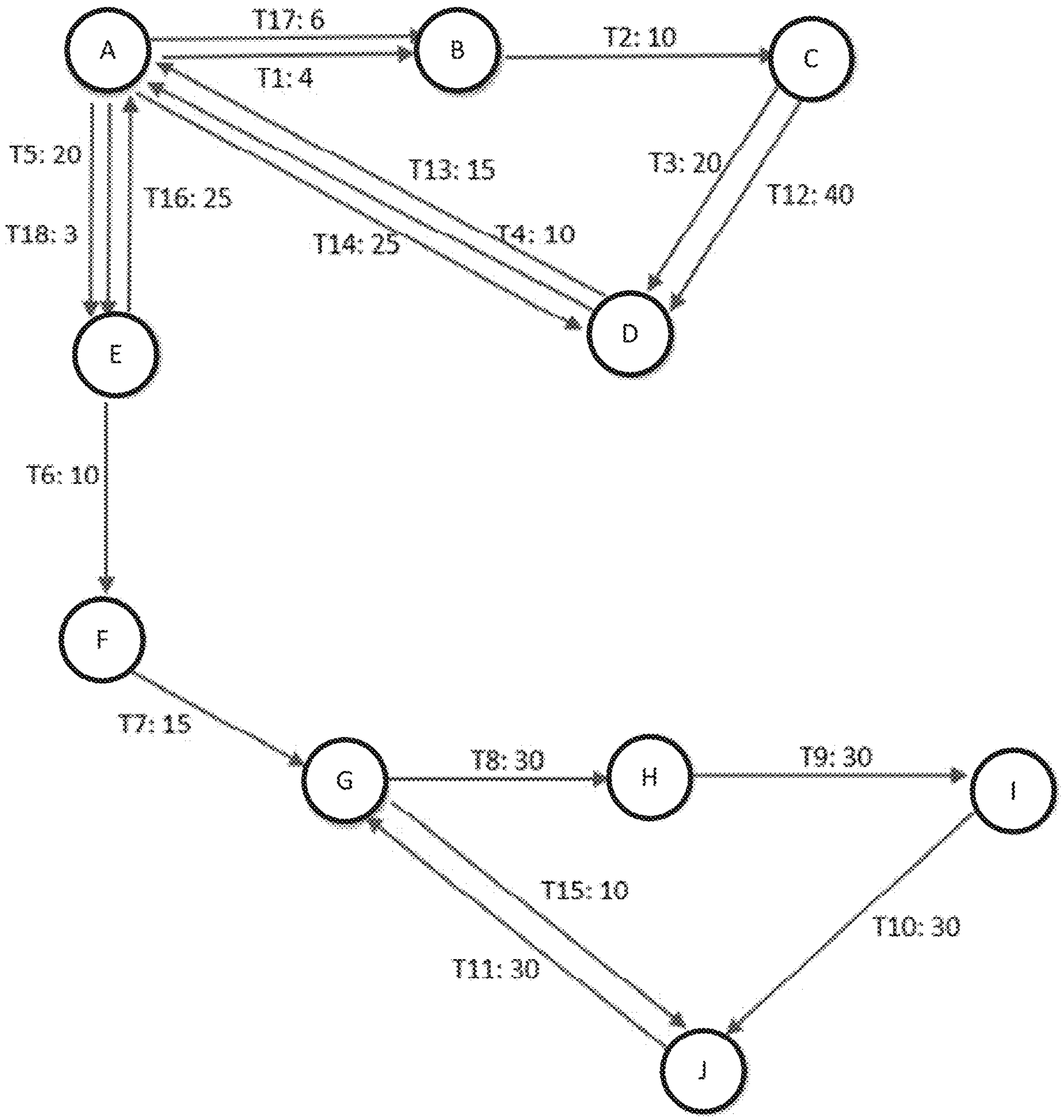
FIG. 5A depicts an example weighted directed graph.

FIG. 5A depicts a sample directed weighted graph for the bucket of obligations of Table 2. As depicted, the directed weighted graph includes participants and their respective obligations between each other for delivery of a commodity. For example, as depicted, according to trade number 17, participant A is obligated to deliver a quantity of 6 units to participant B. Participant B is obligated to deliver a quantity of 10 units to participant C and so on. The sample directed weighted graph is depicted without any crossing edges. The sample directed weighted graph may be depicted in other ways if the underlying information, the participants, the edges, and the weights remain the same. The directed weighted graph may not be generated visually, but rather the relationships between participants may be stored in a data store. For example, the directed weighted graph may be stored using an adjacency matrix and adjacency list or in a relational database.

At act A130, one or more obligation circles are identified in the directed weighted graph. Obligation circles are obligations from three or more participants that when combined zero out at least portion (quantity) of the obligation. For determining obligation circles, the weighted portion (quantity) may be ignored as each obligation includes at least a base unit of one. The quantity that is netted out is determined below at act A140. The simplest obligation circle involves three participants. For example, Participant A may have an obligation to deliver 10 units to Participant B, Participant B may have an obligation to delivery 8 units to Participant C, and Participant C may have an obligation to deliver 12 units to Participant A. Obligation circles may be identified in the graph by identifying directed cycles. A directed cycle is a path that can lead you to the vertex you started the path from. To identify obligation circles, an iterative approach of visiting a neighbor is applied at each node. For each participant (P) the algorithm visits adjacent unvisited vertex, neighbor vertex (N). The path between P and N is marked as visited. N is pushed onto a stack. The process is repeated for every neighbor until the genesis node (P) is reached or there are no unvisited paths. If the process reaches the genesis node, there is a circle which is identified for (P). The process is repeated for vertices in the stack. The stack pops all the vertices from the stack that do not have adjacent vertices to be visited yet. The process is repeated until the stack is empty. The algorithm is performed for all participants. In this way, all circles are identified. For example, a first circle may be identified when starting at participant A that includes B, C, D, and E. However, this may miss a larger circle that includes A, B, C, D, E, F, H, and G. However, by performing the iterative approach for all participants (vertices) the algorithm identified both the smaller and larger circle.

Further, if not identified previously, netting trades may be identified. The term net refers to some quantity of an obligation that may be directly zeroed out between two parties. For example, if Participant X is obligated to deliver 10 units to Participant Y and Participant Y is obligated to deliver 6 units to Participant X then the 6 units may be "netted" out, leaving only an obligation for Participant X to deliver 4 units to Participant Y. Trade netting may be identified and netted prior to the optimization process, when the obligations are initially identified, or when the trades are initially performed (trade netting may be considered a settlement attempt prior to delivery).

Figure 5B:
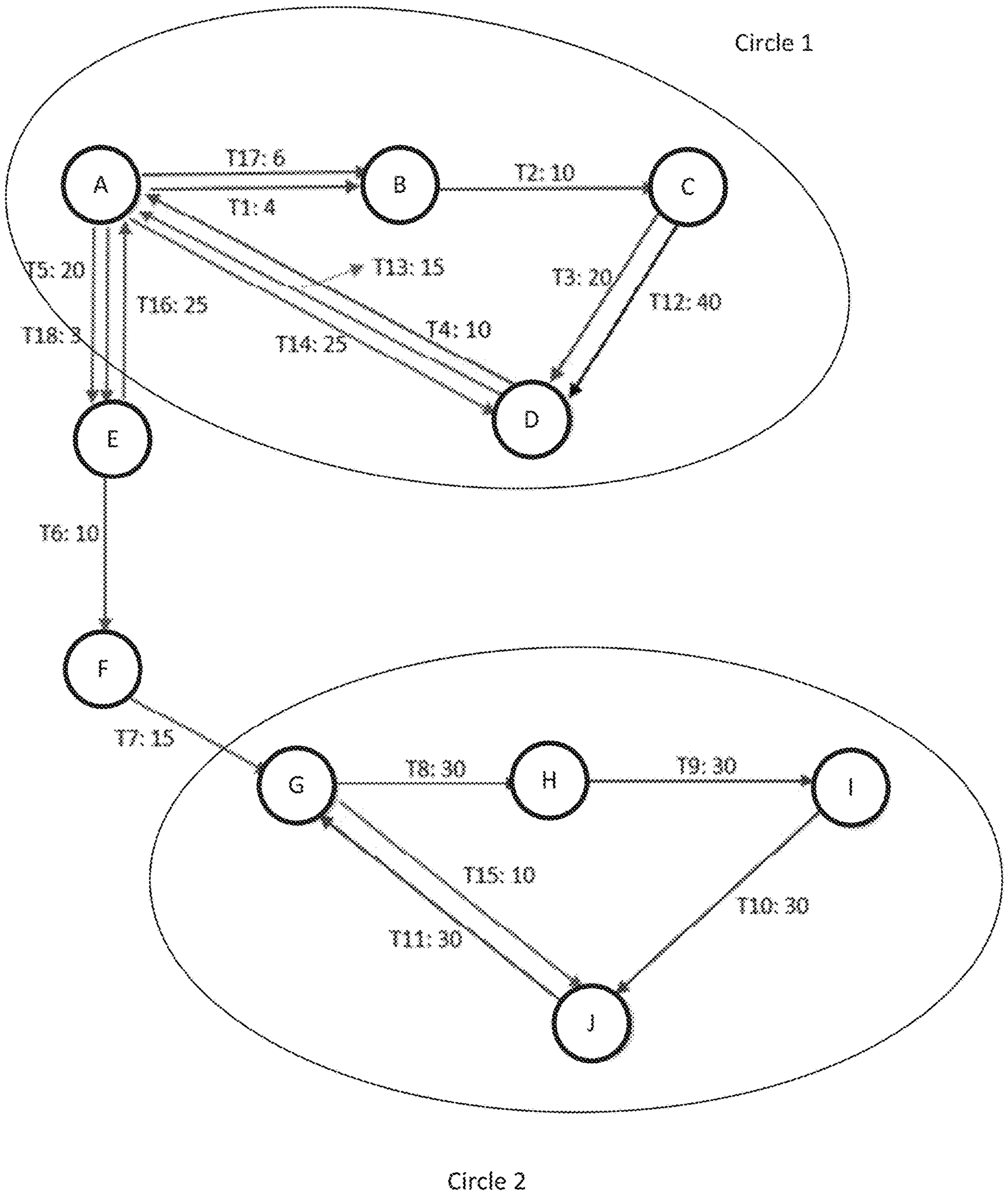
FIG. 5B depicts obligation circles in an example weighted directed graph.

FIG. 5B depicts the two trade circles of the directed weighted graph of FIG. 5A. The two circles identified are Circle 1 including participants A, B, C, and D and Circle 2 including participants G, H, I, and J. The multiple iterations of the algorithm allow the process to capture all the obligation circles.

Figure 6A:
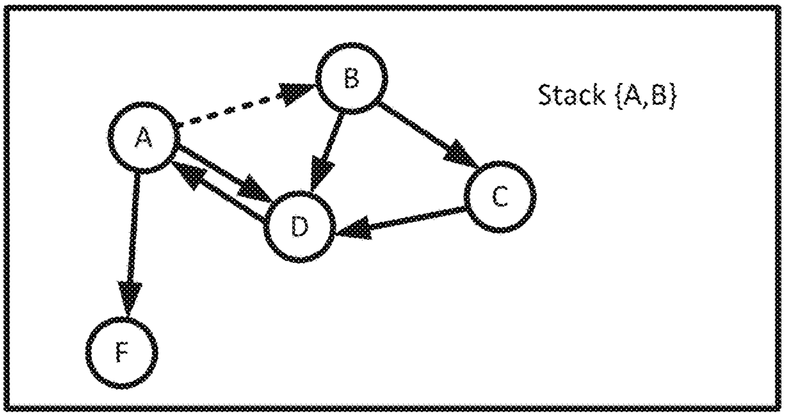
FIGS. 6A-6D, 7A-7E, 8A-8C, 9A-9D, 10A-10C depict an example iterative search of a directed graph.
Figure 6B:
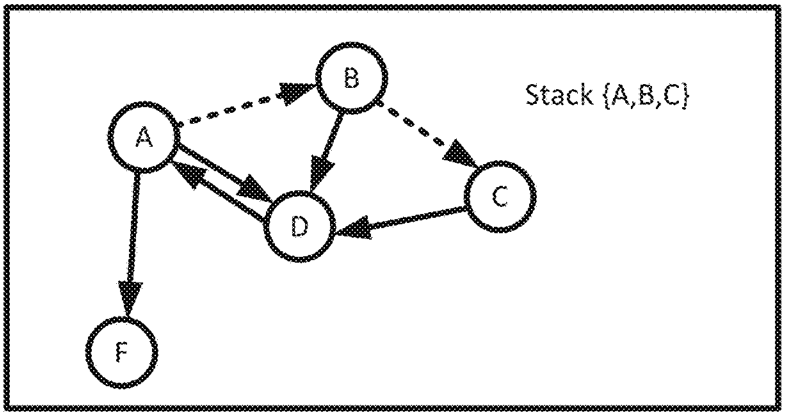
Figure 6C:
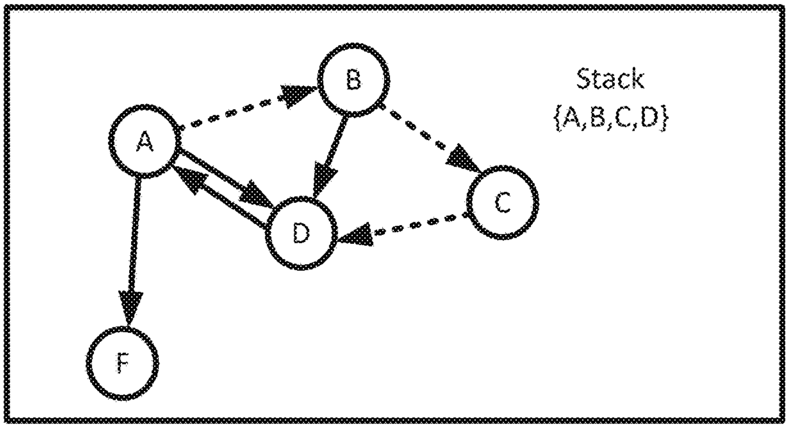
Figure 6D:
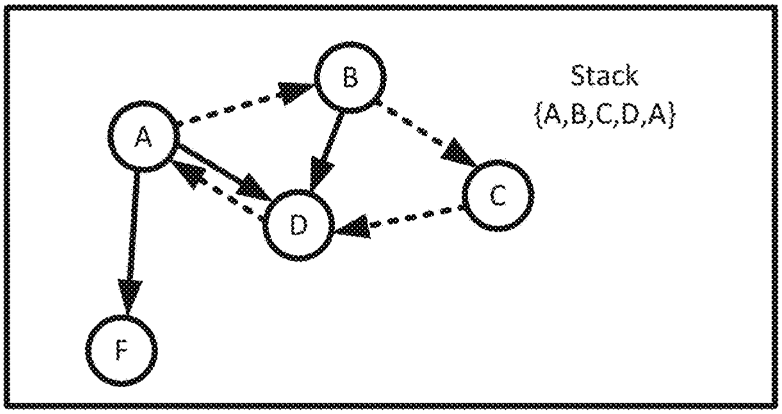

FIGS. 6A to 10C depict an example search process of one iteration of the algorithm starting at node A on a sample graph of five participants. The example is different than the example described above in FIG. 5A and FIG. 5B to explain a portion of the iterative search. In FIG. 6A, the search starts at A. The search pushes neighbor B onto the stack and marks the path between A and B as visited (depicted as dashed). The stack includes both A and B. The process is repeated in FIG. 6B by pushing neighbor C onto the stack and then neighbor D onto the stack in FIG. 6C. In FIG. 6D, the genesis vertex, e.g. A is identified and added to the stack. The circle is then traced from D to C to B to A. The algorithm continues by checking for unvisited paths by popping up vertexes from the stack. D has no more unvisited paths and is removed. Any path from D is mark as unvisited again. C has no more unvisited paths and is removed. Any path from C is mark as unvisited again. Removal of D and C from stack is depicted in FIGS. 7A to 7C.

Figure 7A:
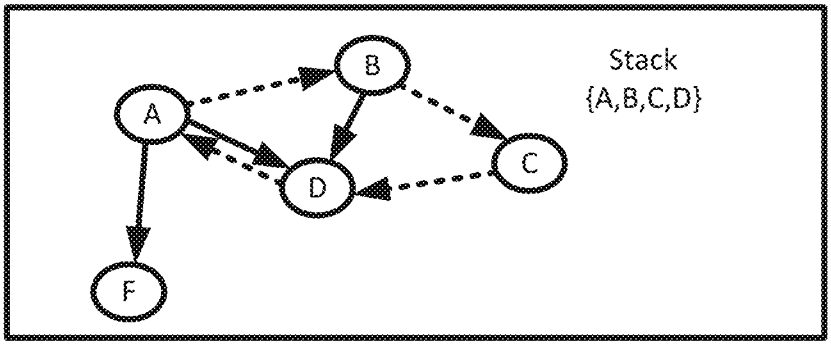
Figure 7B:
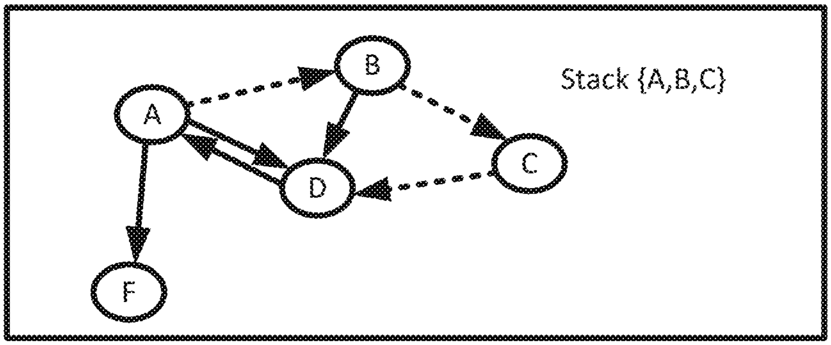
Figure 7C:
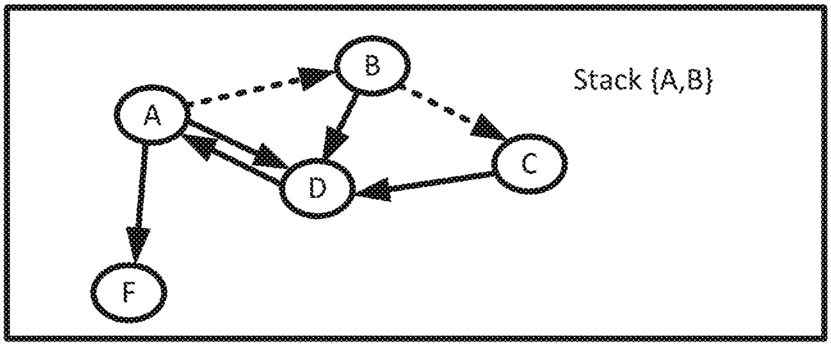
Figure 7D:
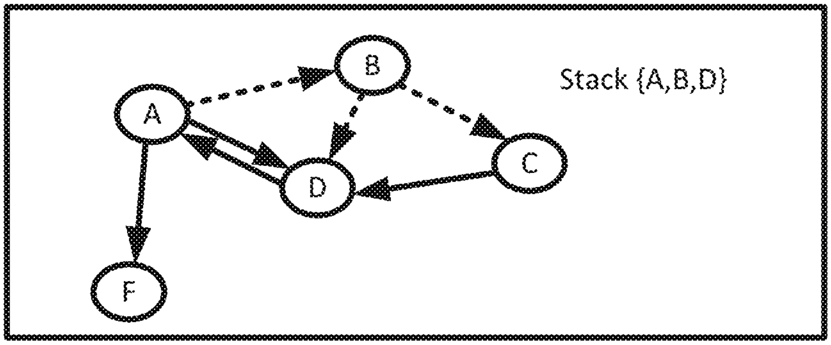
Figure 7E:
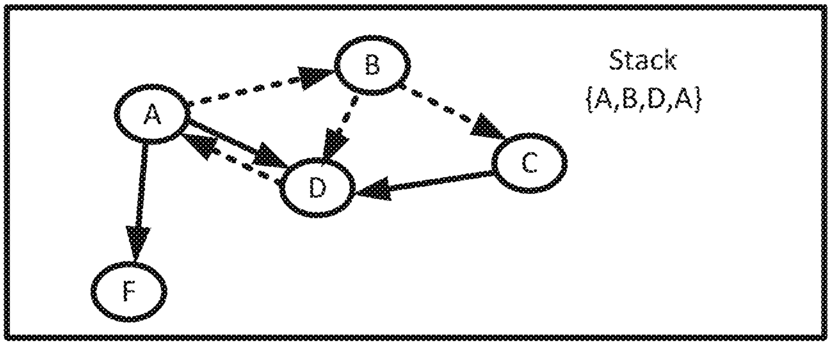

The iterative algorithm continues to find a path from B to D and add it to stack marking path between B and D as visited, FIG. 7D. In FIG. 7E, the genesis vertex, e.g. A is identified and added to the stack. The circle is then traced from D to B to A.

Figure 8A:
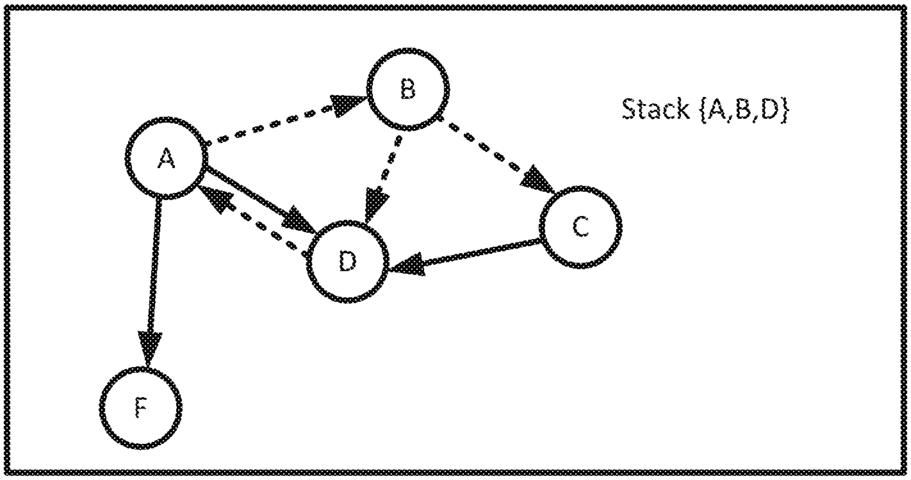
Figure 8B:
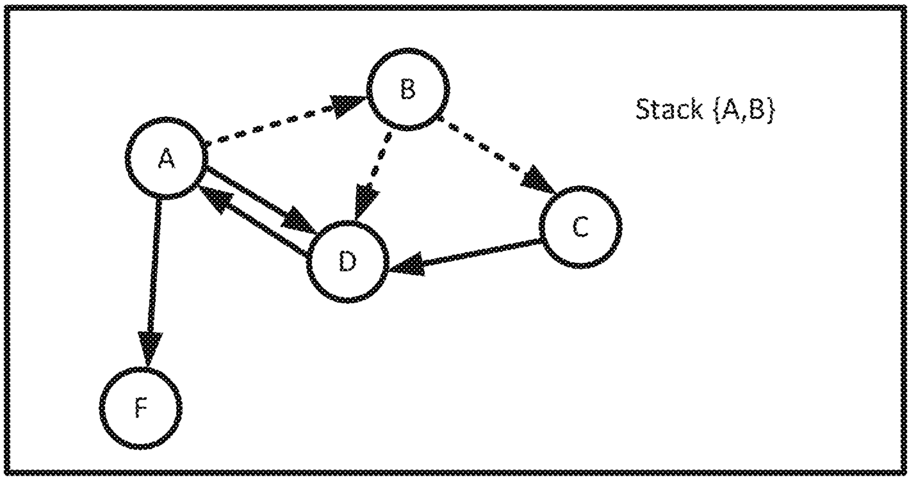
Figure 8C:
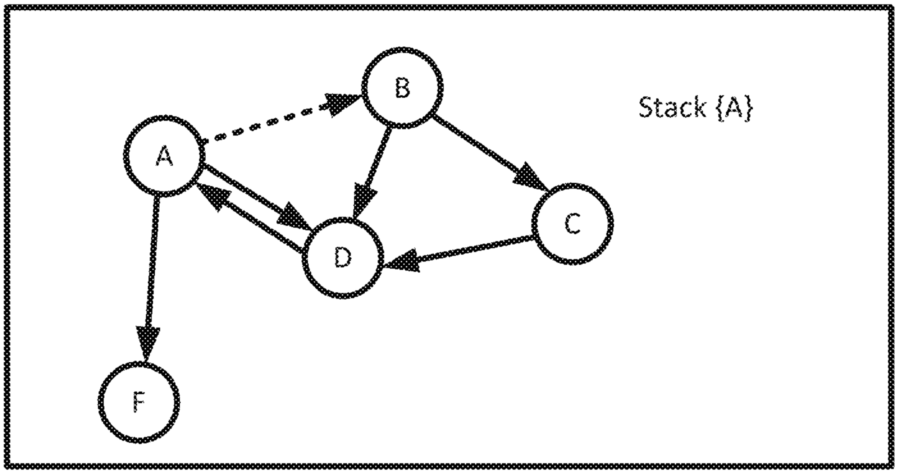

The algorithm continues by checking for unvisited paths by popping up vertexes from the stack. D has no more unvisited paths and is removed. Any path from D is marked as unvisited again. B has no more unvisited paths and is removed. Any path from B is marked as unvisited again. Removal of D and B from the stack is depicted in FIG. 8A to 8C.

Figure 9A:
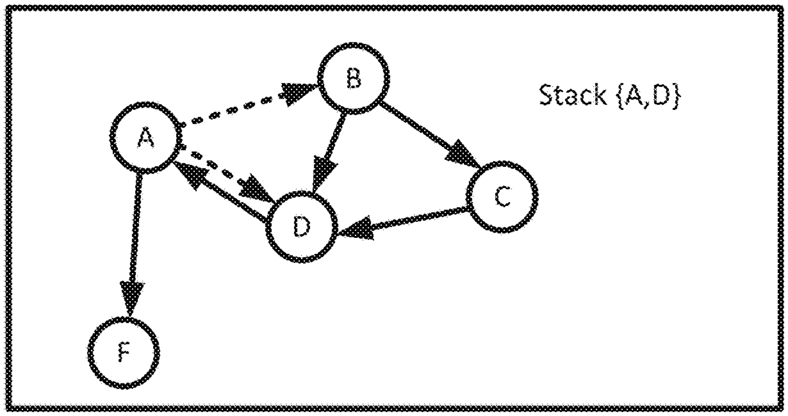
Figure 9B:
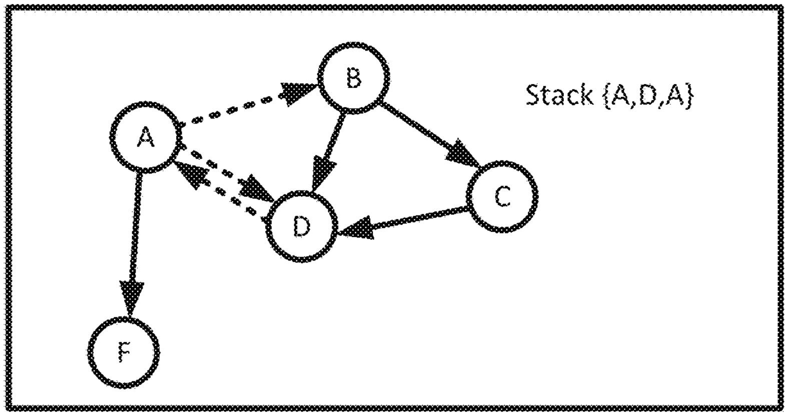

The iterative algorithm continues to find a path from A to D and add it to stack marking path between A and D as visited, FIG. 9A. In FIG. 9B, the genesis vertex, e.g. A is identified and added to the stack. The circle (net) is then traced from D to A.

Figure 9C:
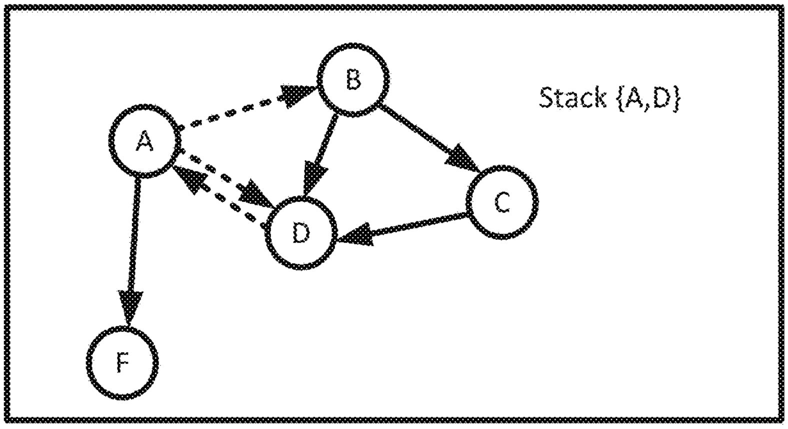
Figure 9D:
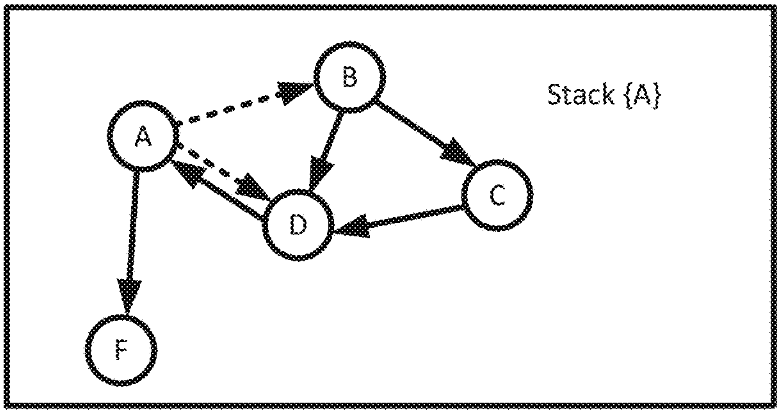
Figure 10A:
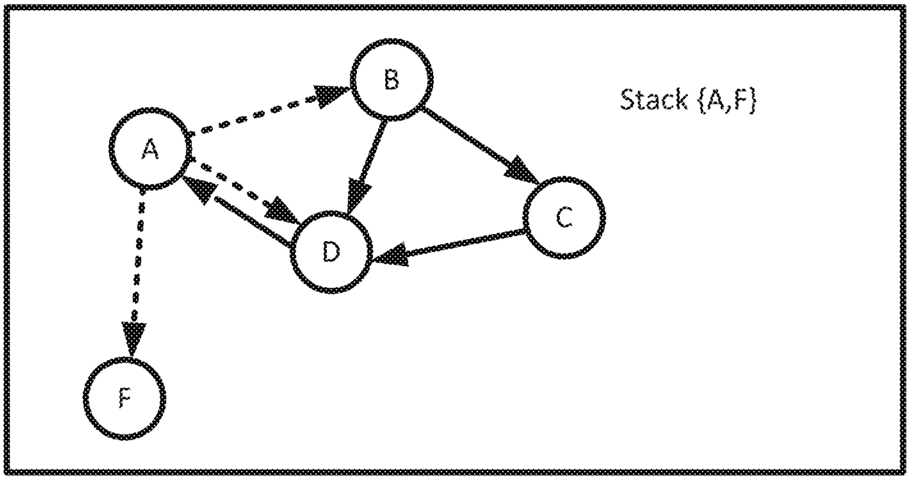
Figure 10B:
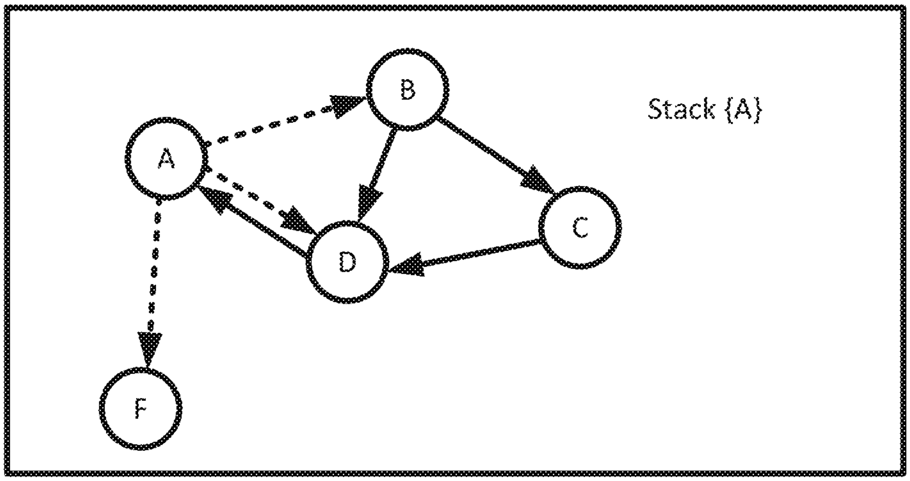
Figure 10C:
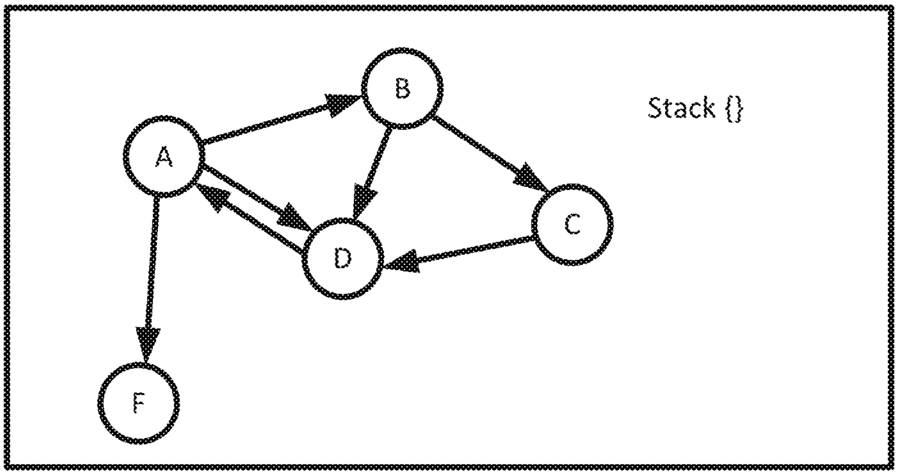

The algorithm continues by checking for unvisited paths by popping up vertexes from the stack. D has no more unvisited paths and is removed. Any path from D is mark as unvisited again. Removal of D from stack is depicted in FIGS. 9C to 9D. The iterative algorithm continues by identifying the path from A to F in FIG. 10A. This, however, is a dead end as F does not have any connections. F is removed from the stack, FIG. 10B. Now stack only has A and all the neighbors are visited already. The algorithm pops out A from stack marking all the paths from A as unvisited, FIG. 10C. The algorithm continues the same process for next vertex/participant B. After the algorithm has been run starting at each of the vertex/participants, the process is terminated. The output of the algorithm is one or more obligation circles.

At act A140, one or more obligations are marked to be altered based on the one or more obligation circles. Once the circle and netting are identified the aggregated portfolio is optimized. The optimization process determines which obligations should be removed or zeroed out. For every circle identified at act A130, the trade optimizer module 131 calculates the path traversed for each circle. The trade optimizer module 131 calculates a maximum notional that can be optimized in the circle. The optimization process starts with the largest path (e.g. number of vertices/participants). If there are multiple paths that have the same path length, the circle with the maximum notional among the optimizable notional of each circle is selected. For each path within the circle, the aggregated notional between two parties or path is limited by reducing the quantity. The notional value is the total value of a position, e.g. how much value a position controls, or an agreed upon amount in a contract. In simple terms the notional amount is essentially how much of the asset a participant is owed or owes. The circle optimization is skipped if the aggregated notional for any path in circle is 0.

After all circles/netting are traversed, the aggregated notional is updated. If updated aggregated notional between two parties is 0 all the trades for the party pair are marked as suggested removal. If updated aggregated notional is not 0 and same as starting notional, all the trades for the party pair are marked as no change. If the updated aggregated notional is not 0 and not same as starting notional, then trades with lowest notional are amended to reduce notional. If there are multiple trades with same notional, the trade with flat price is optimized first. The trade is marked as modification/suggested removal. The remaining trades for the party pair are marked as no change.

For the example of Table 2, the portfolios may be optimized by amending and removing the following obligations:

TABLE 3

| Trade Id | Buyer | Seller | Quantity |
|---|---|---|---|
| T1 | A | B | 4 |
| T2 | B | C | 10 |
| T3 (amended) | C | D | 10 |
| T4 | D | A | 10 |

TABLE 3-continued

| Trade Id | Buyer | Seller | Quantity |
|---|---|---|---|
| T8 | G | H | 30 |
| T9 | H | I | 30 |
| T10 | I | J | 30 |
| T11 | J | G | 30 |
| T17 | A | B | 6 |

In Table 3, the obligations T1, T2, T3, T4, and T17 combine to create a circular obligation between A, B, C, and D as identified at Act A140. For T1 and T17, A is obligated to deliver 10 units to B. For T2, B is obligated to deliver 10 units to C. For T3 C is obligated to deliver 20 units to D. T3 may be amended so that it now represents an obligation of only 10 units. For T4, D is obligated to deliver 10 units to A. The obligation circle thus is a circular obligation to delivery 10 units between the parties and can be netted out (eliminated). There is also a second obligation circle discovered at act A130 that includes G, H, I, and J. The second obligation circle includes obligations T8, T9, T10, and T11. The obligations are each for 30 units and thus may be netted out.

The optimized portfolios now maintain the following obligations:

TABLE 4

| Trade Id | Buy | Sell | Quantity |
|---|---|---|---|
| T3 (amended) | C | D | 10 |
| T5 | A | E | 20 |
| T6 | E | F | 10 |
| T7 | F | G | 15 |
| T12 | C | D | 40 |
| T13 | D | A | 15 |
| T14 | A | D | 25 |
| T15 | G | I | 10 |
| T16 | E | A | 25 |
| T18 | A | E | 3 |

In an embodiment, the obligations may be further optimized by netting similar obligations. For example, T5 and T18 both involve an obligation from A to E. The obligations may be combined to create a single obligation of a quantity of 23. In addition, any netting trades identified at act A130 may also be removed. For example, the obligations of T5 and T18 may be offset against the obligation of T16. T5 and T18represent an obligation of 23 from A to E while T16 represents an obligation of 25 from E to A. The net obligation is a quantity of 2 from E to A. Similarly, T13 and T14 may be netted to result in an obligation of 10 from A to D. After netting the obligations, the final optimized state is:

TABLE 5

| Trade Id | Buyer | Seller | Quantity |
|---|---|---|---|
| T3 (amended) | C | D | 10 |
| T6 | E | F | 10 |
| T7 | F | G | 15 |
| T12 | C | D | 40 |
| T14 (Amended) | A | D | 10 |
| T15 | G | I | 10 |
| T16 (Amended) | E | A | 2 |

The result of the optimization is an elimination of both a total number of obligations and the quantity that must be delivered. It would have been impossible to eliminate the obligations by a single party or two parties in conversation. Only by identifying all obligations of all the participants, graphing, and identifying the obligations circles was the elimination possible.

After optimization, the optimization venue may generate a report for each of the participants. The reported output may be an optimized list of obligations between the plurality of participants. Two or more reports may be generated at participant level or bucket level. A position report details the optimized state for each trade. A cash settlement report details the cash settlement amount for the trades. The cash settlement report may include a list of payments to be made as a result of the eliminated or netted trades. While each participant may see no net gain or loss as a result of the optimization, payments or cash settlement may still be required. For example, if trades from A to B and from C to A and from B to C are eliminated, each party should have no net gain. However, for settlement reasons and to zero out the trades, A may make payment to C and receive payment from B. Each trade may exist on its own and as such may be required to be closed out individually even if the net for all participants is zero. The reports may be transmitted to participants for further action.

Alternatively, the clearinghouse may automatically perform the optimization on the participants portfolios. For example, the clearinghouse may automatically eliminate trades as defined by the optimization report.

Figure 11:
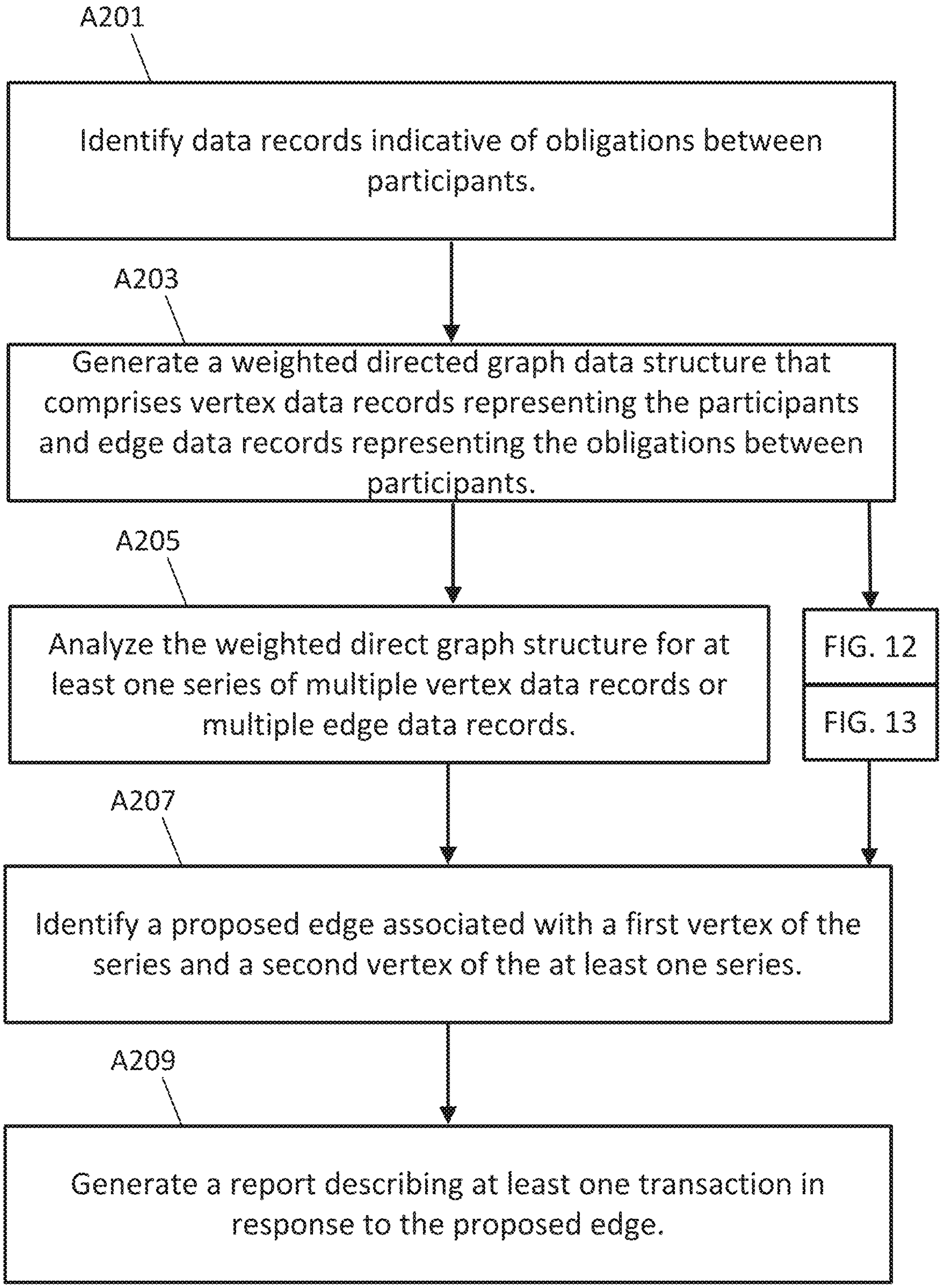
FIG. 11 depicts an example flowchart for calculating a proposed transaction for optimizing a portfolio.

FIG. 11 depicts an example flowchart for calculating a proposed transaction for the optimized portfolio described above. Embodiments may involve all, more or fewer actions indicated by the blocks of FIG. 11. The actions may be performed in the order or sequence shown or in a different sequence. The method may be implemented with computer devices and computer networks, such as those described with respect to FIGS. 1, 2, or 3. For example, FIG. 3 depicts the system that includes the portfolio optimization module 144. As described above, the portfolio optimization module 144 includes the portfolio database 125, the graphics processor 127, the trade optimizer module 131, the prioritization module 129, and the suggestion report generator 133.

As described above, the portfolio optimization module 144 generates a directed graph (e.g., act A120) based on obligations represented by edges for participants that are represented by vertices. The edges may also be associated with weights that represent quantities of the obligations. As described above, the portfolio optimization module 144 modifies one or more obligations based on circles that are netted (e.g., act A140). For every circle identified, the optimizer calculates the path traversed for each circle. The optimizer calculates a maximum notional that can be optimized in the circle. The optimization process starts with the largest path (e.g. the highest number of vertices or participants). If there are multiple paths that have the same path length, the circle with the maximum notional among the optimizable notional of each circle may be selected. For each path within the circle, the aggregated notional between two parties, as represented by the path between the parties, is limited by reducing the quantity. The notional value is the total value of a position, e.g. how much value a position controls, or an agreed upon amount in a contract. In simple terms the notional amount is essentially how much of the asset a participant is owed or owes. The circle optimization is skipped if the aggregated notional for any path in circle is 0.

TABLE 6

| Trade Id | Buyer | Seller | Original Quantity | New Quantity |
|---|---|---|---|---|
| T1 | A | B | 4 | 0 |
| T2 | B | C | 10 | 0 |
| T4 | D | A | 10 | 0 |
| T5 | A | E | 20 | 0 |
| T8 | G | H | 30 | 0 |
| T9 | H | I | 30 | 0 |
| T10 | I | J | 30 | 0 |
| T11 | J | G | 30 | 0 |
| T17 | A | B | 6 | 0 |
| T13 | D | A | 15 | 0 |
| T18 | A | E | 3 | 0 |
| T14 | A | D | 25 | 10 |
| T16 | E | A | 25 | 2 |
| T3 | C | D | 20 | 10 |
| T12 | C | D | 40 | 40 |
| T6 | E | F | 10 | 10 |
| T7 | F | G | 15 | 15 |
| T15 | G | J | 10 | 10 |

Table 6 describes the directed graph for the altered obligations by the portfolio optimization module 144. Trades that have been eliminated through the washout or netting process are associated with a new quantity of 0. In the example of Table 6, these trades include T1, T2, T4, T5, T8, T9, T10, T11, T17, T13, and T18.

Figure 14:
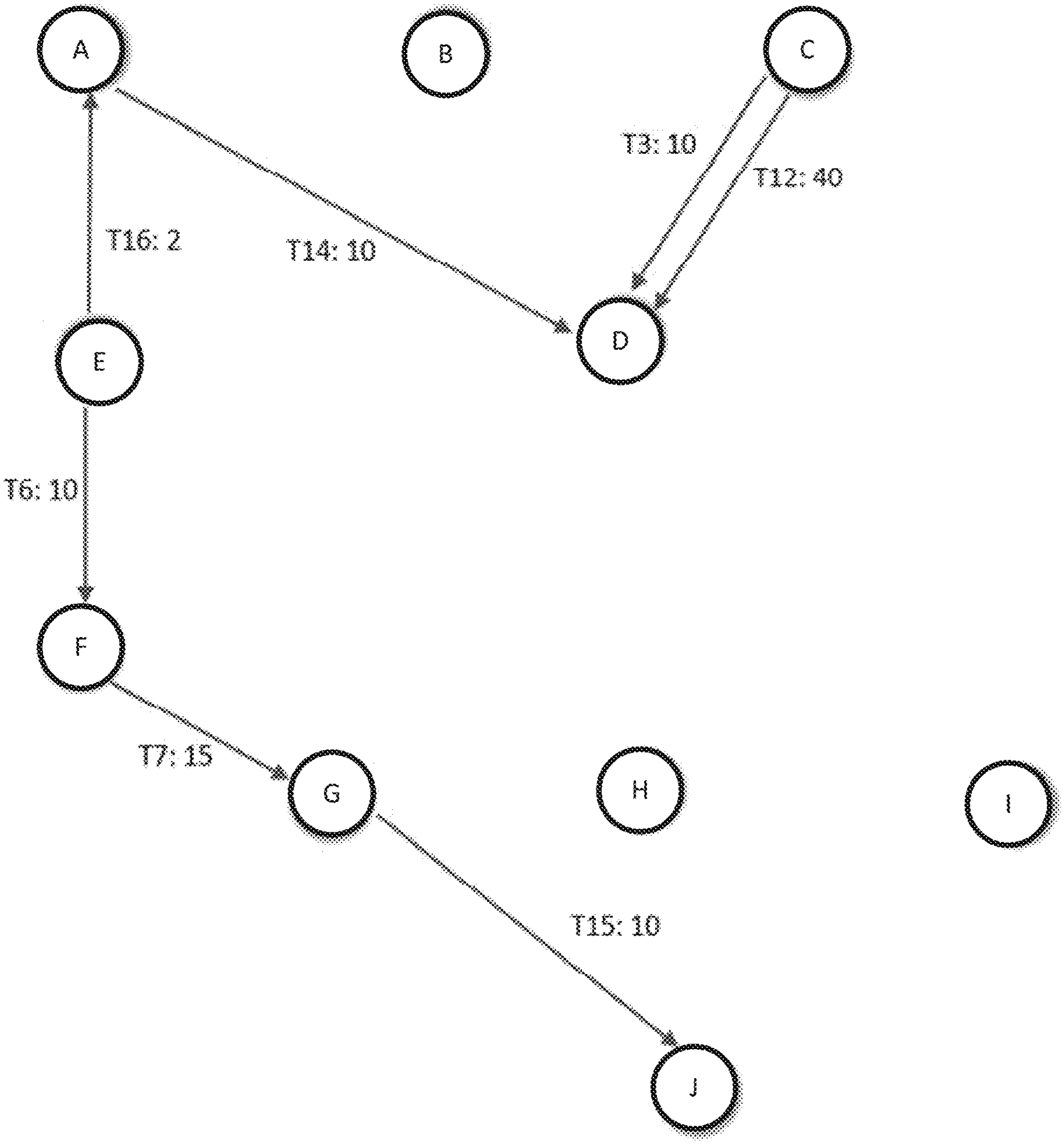
FIGS. 14 and 15 depict example weighted directed graphs for proposed transaction selection.

FIG. 14 illustrates the directed graph that is output from the altered obligations performed by the portfolio optimization module 144. Table 6 includes the remaining weighted directed graph represented by FIG. 15. Table 6 represents a portfolio data structure stored in memory for data records indicative of obligations between the participants. In particular, the portfolio data structure may include the obligations or contracts remaining after the portfolio optimization module 144 optimizes the portfolio data structure based on the circles that are netted. The following embodiments generate communications to participants to suggest transactions that have been calculated to further optimize the portfolio data structure.

TABLE 7

| Trade Id | Buyer | Seller | Original Quantity | New Quantity |
|---|---|---|---|---|
| T14 | A | D | 25 | 10 |
| T16 | E | A | 25 | 2 |
| T3 | C | D | 20 | 10 |
| T12 | C | D | 40 | 40 |
| T6 | E | F | 10 | 10 |
| T7 | F | G | 15 | 15 |
| T15 | G | J | 10 | 10 |

At act A201, the portfolio optimization module 144, or corresponding processor, identifies in a portfolio data structure stored in a memory (e.g., the portfolio database 125) coupled with the processor, data records indicative of obligations between a plurality of participants. The data record indicative of obligations between the plurality of participants may be determined and stored in response to the optimization process described herein. For example, optimization to the obligations described in Table 7.

At act A203, the portfolio optimization module 144 (e.g., the graphics processor 127) is configured to generate a weighted directed graph data structure that comprises vertex data records representing the plurality of participants and edge data records representing the obligations between participants. FIG. 14 illustrates an example weighted graph data structure. The data of Table 7 is illustrated by FIG. 14. Trade identifier 14 representing an obligation between buyer A and seller D having a quantity of 10 is illustrated as the arrow from node A to node D having a weight of 10.

At act A205, the portfolio optimization module 144 (e.g., the graphics processor 127) analyzes the weighted directed graph structure for at least one series of multiple vertex data records or multiple edge data records. There may be multiple series identified from the weighted directed graph structure. That is, the at least one series may include a plurality of series of multiple vertex data records or multiple edge data records.

The series of data records may correspond to two or more nodes linked together by paths or obligations. Here, the series of data records does not correspond to a completed circle that can be eliminated from the graph but rather an almost complete circle. For example, the series of data records may be completed by an additional path or edge. It should be noted that any series of two or more paths may be completed by one additional path or edge. Thus, effectively, the portfolio optimization module 144 identifies two or more paths or obligations in which at least one node is the origin node (buyer) for one of the paths the same node is the terminal node (seller) for another of the paths. Returning to FIG. 14, such as series is provided by the paths from E to A and A to D. Another series is provided by the path from E to F and F to G. Another series is provided by the path from E to F, F to G, and G to J. is provided by the path from F to G and G to J.

In a more detailed embodiment described below with respect to FIGS. 12 and 13, act A205 is replaced with an alternative algorithm.

Figure 15:
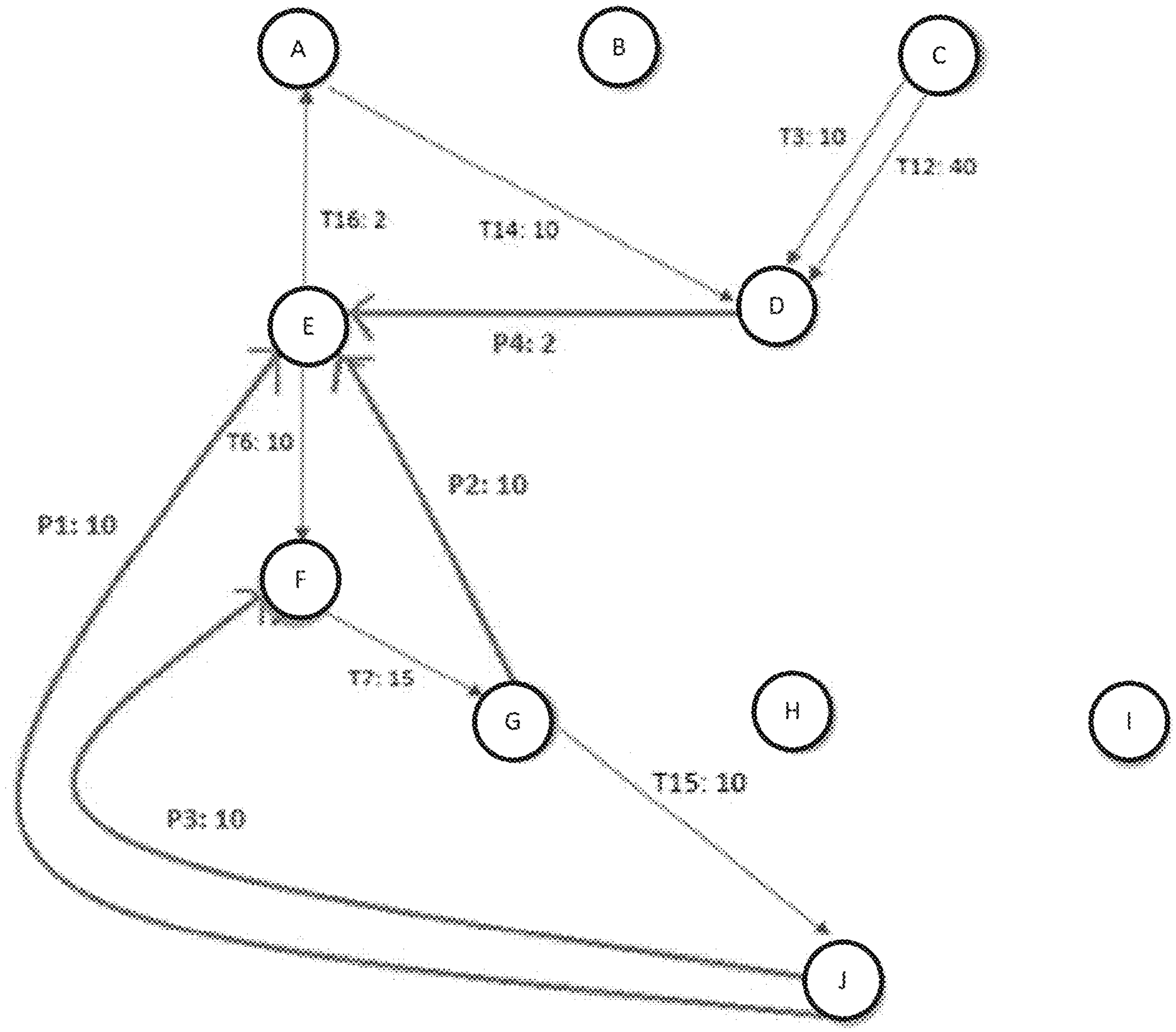

At act A207, the portfolio optimization module 144 (e.g., the graphics processor 127) identifies a proposed edge associated with a first vertex of the series and a second vertex of the at least one series. FIG. 15 illustrates example proposed edges for the example series described for FIG. 14. In the example series provided by the paths from E to A and A to D, the proposed edge P4 completes the circle from D to E. In the example series provided by the path from E to F and F to G, the proposed edge P2 completes the circle from G to E. In the example series provided by the path from E to F, F to G, and G to J, the proposed edge Pl completes the circle from J to E. In the example series provided by the path from F to G and G to J, the proposed edge P3 completes the circle from J to F. These proposed edges are described by Table 8.

TABLE 8

| Trade Identifier | Buyer | Seller | Proposed Quantity |
|---|---|---|---|
| P1 | J | E | 10 |
| P2 | G | E | 10 |
| P3 | J | F | 10 |
| P4 | D | E | 2 |

Table 8 also describes the proposed quantity for the proposed transactions. The proposed quantity may be calculated by the portfolio optimization model 144 as configured to calculate a maximum notional amount for the series or for the proposed edge. The maximum notional amount may be the smallest notional amount in the series.

At act A209, the portfolio optimization module 144 (e.g., the suggestion report generator 133) generates a report or a message describing at least one transaction in response to the proposed edge associated with the first vertex of the series and the second vertex of the series for the at least one of the plurality of participants. The proposed transaction may include a quantity, an underlying asset, and/or potential counterparties to the proposed transaction. The proposed transaction may correspond to an edge that connects two previously disconnected vertices in the weighted directed graph data structure or the proposed transaction may correspond to an increase in notional amount for an edge that already connects two vertices in the weighted directed graph data structure.

The report may include one or more options for the at least one of the plurality of participants to submit the at least one transaction. That is, the report may include a link that allows the participant to propose the transaction to the other party or submit the proposed transaction to the exchange computer system 100. The link may access an ordering system or a webpage.

In one example, the report may list multiple proposed transactions. The report may list the at least one transaction for each of the proposed edges. The multiple proposed transactions may be mutually exclusive. That is, if the first proposed transaction in the list is completed, one or more of the other proposed transactions are no longer applicable to the completion of a circle.

In another example, the report may include a prioritized proposed transaction. The report may list a proposed transaction according to a priority list. The portfolio optimization module 144 may compare a parameter of each of the plurality of series of multiple vertex data records or multiple edge data records. In one example, the parameter is a size of the series. The size of the series may be the number of parties or the number of the multiple vertex data records or a number of the multiple edge data records. In another example, the parameter is a quantity of an underlying contract.

The optimization module 144 may compare the size of the series of a first series to a size of a second series. The largest series may be selected because the largest series provides more simplification to the set of obligations and deliveries. The optimization module 144 may compare the quantity of the underlying contract size. The largest contract size may be selected because the largest contract size provides more simplification to the number of deliveries.

Figure 12:
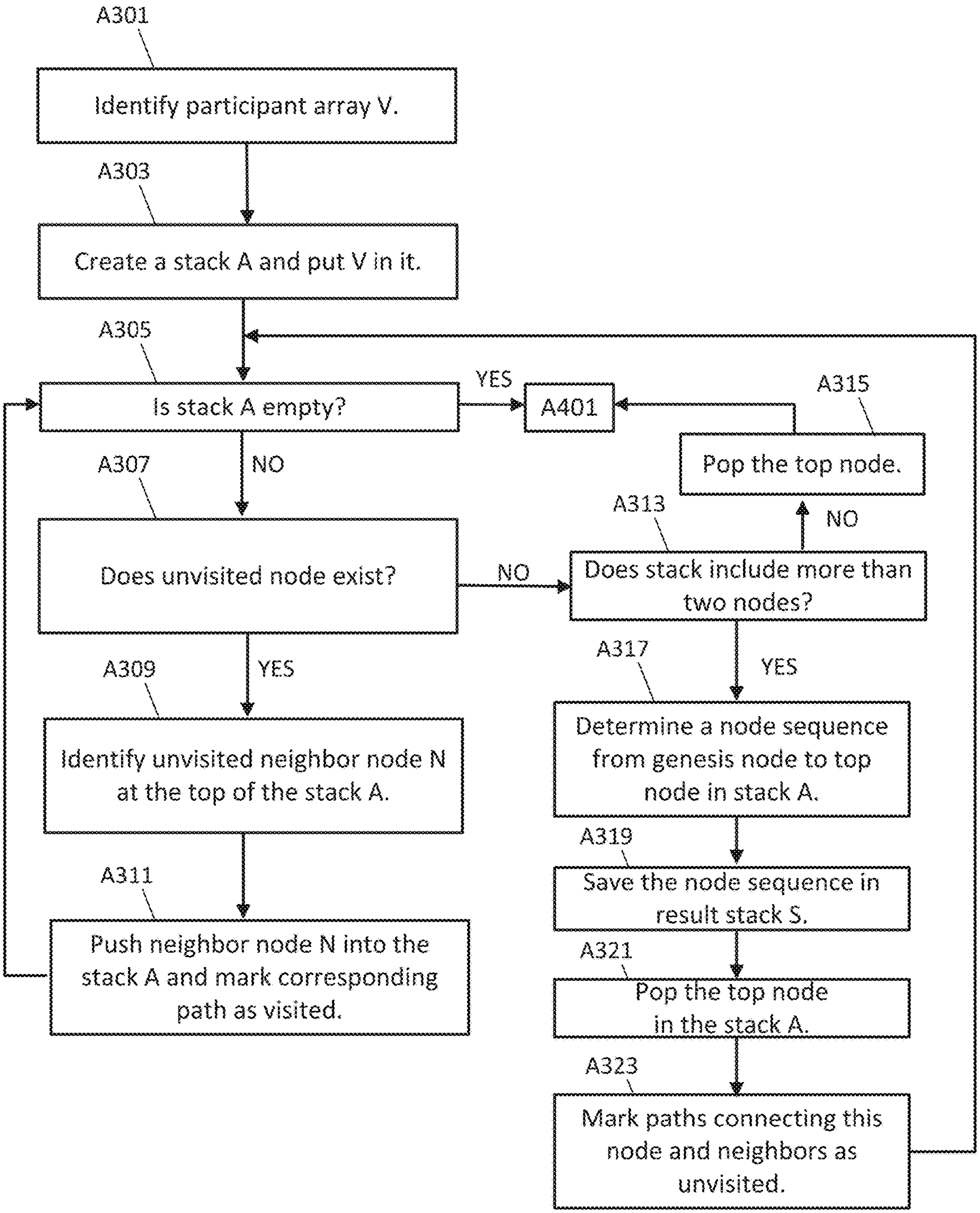
FIG. 12 depicts an example flowchart for determination of transaction series.
Figure 13:
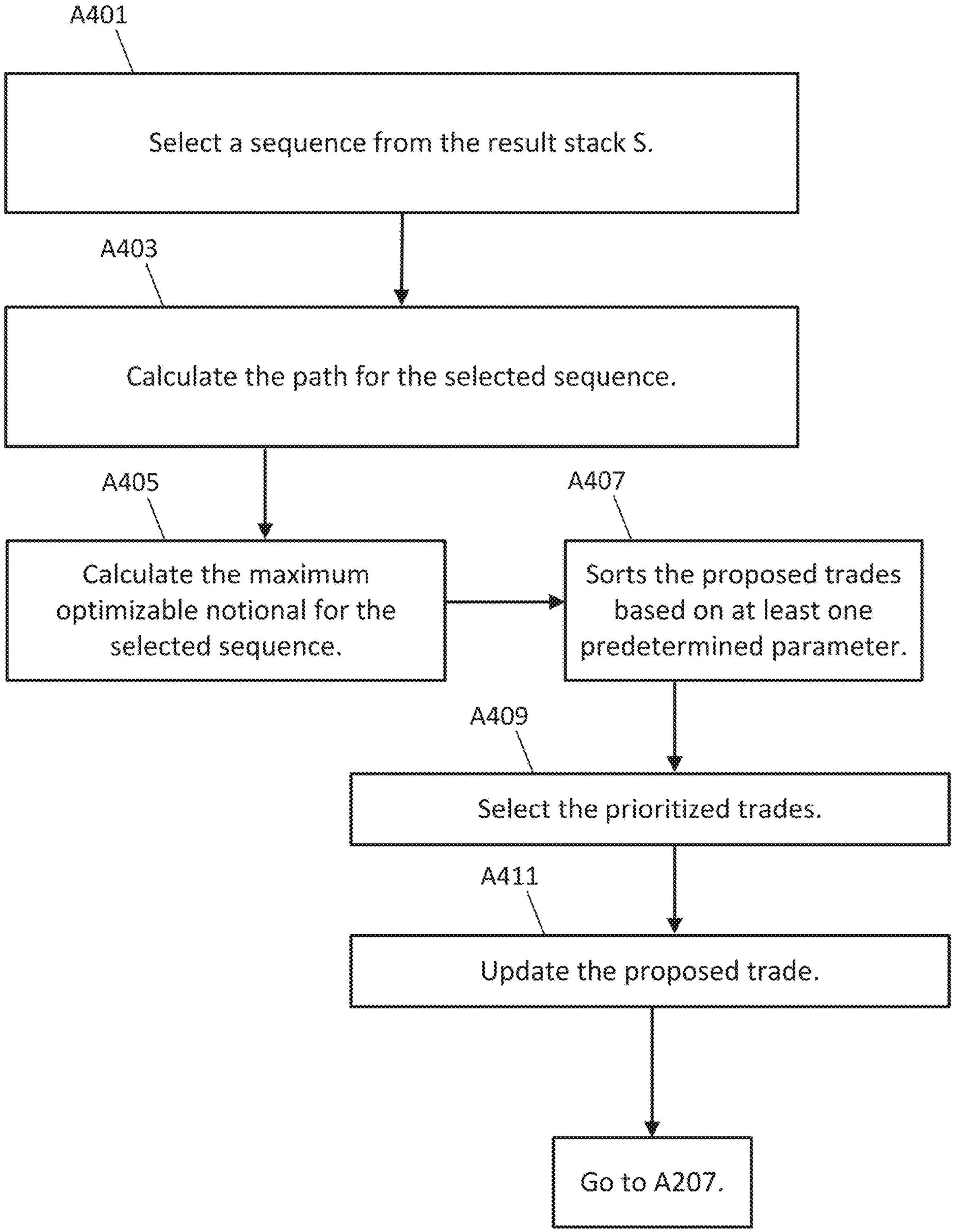
FIG. 13 depicts an example flowchart for selection of the proposed transaction from the transaction series.

FIGS. 12 and 13 provide an alternative to act A205. FIG. 12 illustrates an algorithm for traversing the weighted directed graph data structure to identify the series of data records used to identify the proposed edge or proposed transaction. Additional, different, or fewer acts may be included.

At act A301, the portfolio optimization module 144, or corresponding processor, identifies the participant array V. The array V includes each of the nodes in the weighted directed graph data structure. The participant array V may include all nodes that have a path originating or terminating with the node. Referring to FIG. 14, the example participant array V may be [C, D, A, E, F, G, J].

At act A303, the portfolio optimization module 144, or corresponding processor, initiates a stack A and stores the participant array V in the stack A.

At act A305, the portfolio optimization module 144, or corresponding processor, determines whether the stack A is empty. This is applicable to second and subsequent iterations of the control loop described below. When the stack is empty, the process proceeds to the algorithm of FIG. 13, which begins with act A401. When the stack is not empty, the process proceeds to act A307.

At act A307, the portfolio optimization module 144, or corresponding processor, determines whether an unvisited node exists. An unvisited node is a node included in the participant array V that has not been visited. For example, the portfolio optimization module 144 may maintain a path matrix that includes all of the paths between participants. The path matrix may include all existing obligations. Using the example in FIG. 14, the path matrix may be [AD, CD, EA, EF, FG, GJ]. In another example, the path matrix may include a matrix having all participants and a binary value (e.g., existing or not existing) for each pair of participants. The path matrix may describe the state of a path between the participants. The path matrix may include three-valued logic for each value that indicates one of non-existent, existent and visited (traversed), and existent and non-visited (not traversed).

At act A309, the portfolio optimization module 144, or corresponding processor, identifies an unvisited neighbor node N at the top of the stack A. The neighbor nodes may be identified by consulting (e.g., accessing and analyzing) the path matrix. Whether or not the neighbor node has been visited may be determined by consulting (e.g., accessing and analyzing) the path matrix.

At act A311, the portfolio optimization module 144, or corresponding processor, push or adds neighbor node N and marks the path matrix to indicate the path to node N is visited. The process returns to act A305. In this loop, the process traverses the series to the full extent of the path. The process repeats the loop until no unvisited node exists, which may be determined by the path matrix.

At act A313, when no unvisited node exists as determined by act A307, the portfolio optimization module 144 determines whether the stack includes two or more nodes. The number of nodes in the stack indicates the path traversed. When the number is less than two, only a single node is included and no obligations apply. When the number is less than two, the portfolio optimization module 144, or corresponding processor, pops or removes the top node, as shown by act A315, and the process proceeds to act A401, as described below.

At act A317, when the stack includes two or more nodes, the portfolio optimization module 144, or corresponding processor, determines a node sequence from the genesis node to top node in the stack A. The genesis node is the original node for the series. The genesis node may be at the bottom of the stack. The contents of the stack define the series of obligations. At act A319, the portfolio optimization module 144, or corresponding processor, saves the node sequence to memory in a result stack S.

It should be noted that while the full extent of stack A at this point defines a series, other series may be present. At act A321, the portfolio optimization module 144, or corresponding processor, pops or removes the top node in the stack A. At act A323, the portfolio optimization module 144, or corresponding processor, marks paths connecting this node and neighbors as unvisited. The process returns to act A305. One or more additional paths may be traversed using the next node in stack A.

FIG. 13 illustrates an example algorithm for analyzing the result stack S. The algorithm of FIG. 13 may be performed by the portfolio optimization module 144 after the weighted directed graph data structure has been fully analyzed to identify the resulting series, which are stored in the result stack S. As indicated by act A305, the weighted directed graph data structure is fully analyzed when stack A is empty (i.e., all the nodes have been removed).

At act A401, the portfolio optimization module 144, or corresponding processor, selects a sequence from the result stack S. Using the example of FIG. 14, the result stack may include sequences of EAD, EFG, EFGJ, and FGJ (e.g., S=[EAD, EFG, EFGJ, and FGJ]). The portfolio optimization module 144 selects a first sequence, for example, EAD from stack S. At act S403, the portfolio optimization module 144, or corresponding processor, calculates a path for the selected sequence. The path may be the nodes that make up the sequence (i.e., node E, node A, and node D).

At act A405, the portfolio optimization module 144, or corresponding processor, calculates a maximum optimizable notional for the selected sequence. A quantity for the underlying asset may be determined for each section of the path. That is, the portfolio optimization module 144 may identify the first quantity from node E to node A as 2, and the second quantity from node A to node D as 10. The portfolio optimization module 144 may identify the smallest quantity in the sequence. This is the quantity for any proposed transaction to create a circle for the sequence.

At act A407, the portfolio optimization module 144, or corresponding processor, prioritizes the calculated paths using at least one predetermined parameter. The predetermined parameter may be selected by user input. Examples for the parameter may include the size of the sequence or notional that can be reduced by the proposed trade. The portfolio optimization module 144 may sort the sequences identified from stack S according to the number of nodes in the sequence. The at least one predetermined parameter may be a plurality of parameters that are prioritized in a particular sequence (e.g., priority list). For example, the sequence may specify that the first parameter is the number of parties in the sequence and the second parameter is the size of the notional that is reduced by the proposed trade. An additional parameter may include the delivery dates (e.g., earlier delivery dates or the earliest delivery date in the proposed trade) such that potential trades are prioritized based on the amount of time until delivery, which corresponds to the amount of time the parties are impacted by the efficiency of the proposal. Another additional parameter may include a user preference. The user may select the prioritized trade. Alternatively, the user may specify a particular counterparty, underlying asset, or other characteristic of the sequence for the priority that is sorted in act A407. The portfolio optimization module 144 is configured to receive user input (e.g., in the example of a data file) that specifies the parameters for the predetermined sequence. The received predetermined sequence may include any combination of (two or more of) quantity of parties, quantity of notional amount, specific underlying assets, specific counterparties, or other parameters in any order.

At act A409, the module may select the trades prioritized by act 407 to maximize profits for all participants.

At act A411, the portfolio optimization module 144, or corresponding processor, validates and updates the remaining proposed trades based on the one selected by act A409. Using this algorithm, the sequences from the stack S are prioritized and selected, subsequent to act A411, the process returns to act A207 as described above.

Figure 16:
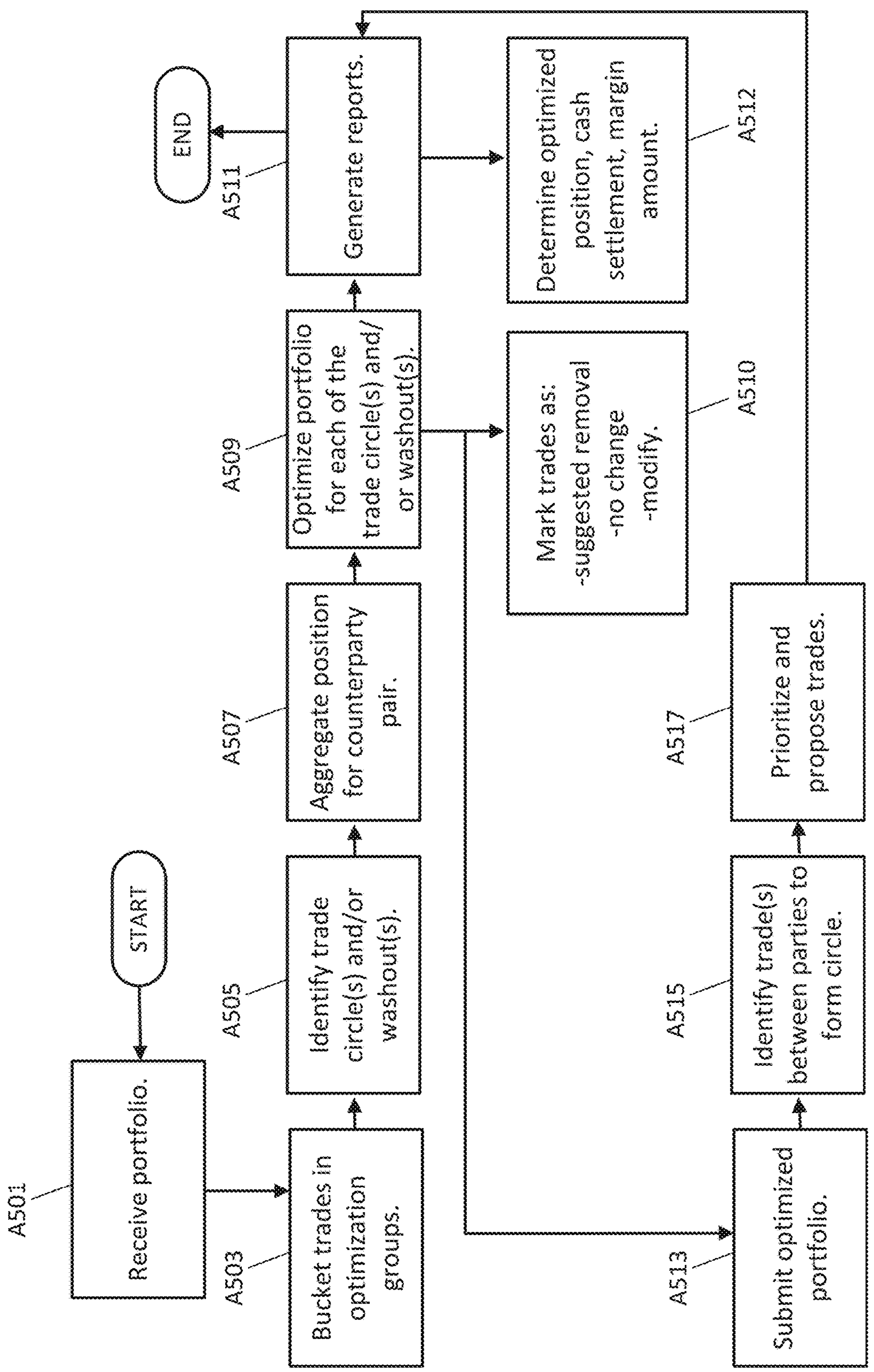
FIG. 16 depicts an example flowchart for generation of a report for a proposed transaction.

FIG. 16 depicts an example flowchart for generation of a report for a proposed transaction that includes the optimization algorithm of FIGS. 4-10 with the transaction suggestions of FIGS. 11-16. Additional, different, or fewer acts may be included.

At act A501, the portfolio optimization module 144 receives data indicative of a portfolio. The portfolio data may include a list of positions between pairs of participants. Each position may include one or more characteristics such as a type of the underlying asset, a quantity of the transaction, and a delivery date for the transaction.

At act A503, the portfolio optimization module 144 buckets or sorts trades into optimization groups. For example, the trades may be sorted according to the underlying asset and/or the delivery date. At act A505, the portfolio optimization module 144 identifies trade circles and/or washouts. The circles may be identified by determining a sequence of positions from the portfolio data that begins and ends at the same participant.

At act A507, the portfolio optimization module 144 aggregates positions for a counterparty pair. When a trade circle or washout has been identified as a sequence of position that begins and ends at the same participant, the positions for each counterparty pair in the circle or washout may be removed from the portfolio data. In some examples, the portfolio optimization module 144 sends a message to the participants forming the counterparty pair requesting approval to remove the positions from the portfolio data. At act A509, the portfolio optimization module 144 optimizes the portfolio for each of the trade circles and/or washouts by removing the positions from the portfolio data.

At act A510, the portfolio optimization module 144 marks or designates trades from the optimization. Examples for the designation include suggested removal, no change, or modify. The portfolio optimization module 144 may analyze the quantities of the positions from the portfolio data for this determination. For example, within a circle, the common quantity among positions may be marked as removal. Any position with an excess quantity (e.g., when one position in the circle is at a higher quantity than another position in the circle) may be marked as a modified position. For example, these positions may be reduced to the highest common quantity of the circle. Positions not involved in a circle may be marked as no change. Optionally, one or more reports may be generated at act A511. For example, reports may be sent to the participants describing the positions that are removed from the portfolio data.

At act A513, the portfolio optimization module 144 submits the optimization portfolio for additional transaction proposals. Permission may be obtained from the participants before the analysis for additional transaction proposals is performed. For example, the portfolio optimization module 144 may determine the potential for transaction proposals and generate a request message that is transmitted to one or more participants. In response to a confirmation message from one or more participants, the process proceeds to act A515.

At act A515, the portfolio optimization module 144 identifies trades that potentially form circles between parties. For example, a series of two or more participants may be identified. For any series of two or more participants there is at least one hypothetical transaction that creates a circle including the two or more participants. The portfolio optimization module 144 may iteratively identify all of the series of two or more participants included in the portfolio data. For example, the portfolio optimization module 144 may generate a list of all of the positions and identify a participant that is included in two or more positions. The portfolio optimization module 144 determines whether the direction of the two or more positions is different (e.g., whether the participant is a buyer in one of the positions and a seller in the other position). If so, this is a series that may result in a proposed transaction.

At act A517, the portfolio optimization module 144 prioritizes the identified trades to select proposed transactions. The proposed transaction connects one of the participants in the series of two or more participants to another of the participants in the series of two or more participants. In other words, the proposed transaction includes a buyer that is one of the participants and a seller that is one of the participants. If executed, the proposed transaction creates a circle that can be optimized similarly to the techniques described with respect to act A509.

At act A511, the portfolio optimization module 144 generates a report including the proposed transaction. The report may include the characteristics of the proposed trade such as a buyer participant, a seller participant, an underlying asset, a quantity, and a delivery date. The portfolio optimization module 144 may send the report to the involved participants. At act A512, the portfolio optimization module 144 determines additional information for the report. For example, the portfolio optimization module 144 may determine a resultant optimized position after the proposed trade, a cash settlement amount for the proposed trade, or a margin adjustment for the proposed trade.

Figure 17:
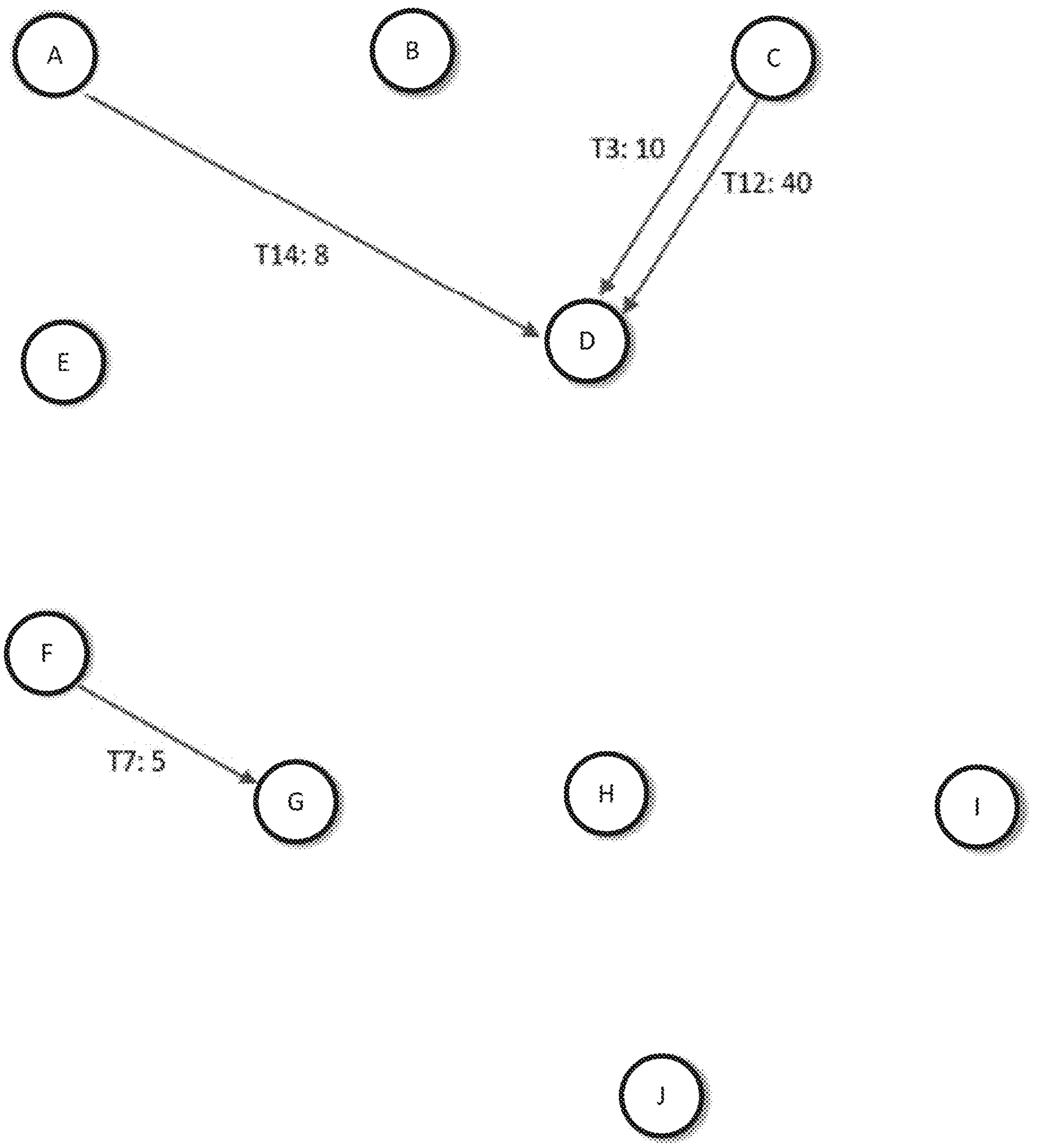
FIG. 17 illustrates an example resultant weighted graph after proposed transactions are executed.

FIG. 17 illustrates an example resultant weighted graph after proposed transactions are executed. Table 9 describes the new quantities that result after the proposed transactions of Table 8 are executed. T3 and T12 remain unchanged and T7 and T14 remain with modified quantities. No other trades remain in the portfolio. Thus, the portfolio has been simplified to reduce the number of transactions. Because the number of transactions is reduced, less bandwidth is required to communicate the positions to market participants. Because the number of transactions is reduced, less computer hardware is necessary to maintain the positions in the exchange computing devices. Because the number of transactions is reduced, participants are required to make delivery or other arrangements to fulfill the contracts of the portfolio.

TABLE 9

| Trade Id | Buyer | Seller | Original Quantity | New Quantity |
|---|---|---|---|---|
| T6 | E | F | 10 | 0 |
| T15 | G | J | 10 | 0 |
| T16 | E | A | 2 | 0 |
| T14 | A | D | 10 | 8 |
| T7 | F | G | 15 | 5 |
| T3 | C | D | 10 | 10 |
| T12 | C | D | 40 | 40 |
| P1 | J | E | 10 | 0 |
| P4 | D | E | 2 | 0 |

In one example, a set of portfolio data includes 18 positions. After performing the transaction optimization, the number of positions is reduced to 7, which is a 61% reduction. Further suggestions for transaction optimization for three additional proposed transactions reduced the number of positions to 4, which is a 78% reduction. In this way, the disclosed embodiments for portfolio optimization and suggested transactions may reduce a portfolio to a first reduced number of positions after a first stage of optimization and reduce the portfolio to a second reduced number of positions after a second stage of optimization including transaction suggestions.

IX. Conclusion

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the scope of this invention.

Further embodiments of the invention are illustrated in the following numbered clauses:

Clause 1. An apparatus comprising: a portfolio database configured to store portfolio data including data records indicative of obligations between a plurality of participants; a graphics processor configured to analyze a weighted directed graph data structure that comprises vertex data records representing the plurality of participants and edge data records representing the obligations between participants and identify a proposed edge associated with a first vertex of at least one series of vertex data records or edge data records and a second vertex of the at least one series; and a suggestion report generator configured to generate a report describing at least one transaction in response to the proposed edge associated with the first vertex of the series and the second vertex of the series for the at least one of the plurality of participants.

Clause 2. The apparatus of clause 1, wherein the at least one series of vertex data records or edge data records includes a plurality of series of multiple vertex data records or multiple edge data records.

Clause 3. The apparatus of clause 2, further comprising: a prioritization module configured to perform a comparison of at least one parameter of the respective plurality of series and select a priority series from the plurality of series based on the comparison.

Clause 4. The apparatus of clause 3, wherein the at least one parameter is a number of the multiple vertex data records or a number of the multiple edge data records.

Clause 5. The apparatus of clause 3, wherein the at least one parameter is a quantity of an underlying contract.

Clause 6. The apparatus of clause 3, wherein the at least one parameter includes a plurality of parameters.

The invention claimed is:

1. A computer-implemented method for portfolio data structure reduction, the method including:

accessing, by a first processor, a portfolio data structure, the portfolio data structure including data records of obligations between a plurality of participants, the data records of obligations including edges between vertices within a graph data structure, the first processor including an architecture specialized for matrix operations;

traversing, by the first processor, the portfolio data structure iteratively by vertex to identify a plurality of paths from a first vertex, at each iteration placing an identified path in a processing stack;

determining, by a second processor different from the first processor, that no more unvisited vertices from the first vertex exist, popping the first vertex from a processing queue for the processor;

determining, by the second processor, an optimized notional for each of the plurality of paths;

determining, by the second processor and for each of the plurality of paths in the processing stack, a respective proposed transaction that creates a circular obligation for that path with the optimized notional;

sorting, by the second processor, the plurality of proposed transactions based on a first predetermined parameter to apply prioritization to the proposed transactions;

selecting, by the processor and based on the prioritization of the proposed transactions, a top priority transaction;

prioritizing, by the second processor, generation of an update message identifying top priority transaction regardless of the maximum notional value determined for any identified circular path elsewhere within the portfolio data structure;

generating, by the second processor, the update message; and sending, via an electronic communications network, the update message to at least a first participant with an obligation to be altered by the top priority transaction.

2. The computer-implemented method of claim 1, wherein the predetermined parameter includes a length of the circular obligation for the corresponding proposed transaction and/or a user-defined parameter.

3. The computer-implemented method of claim 1, wherein the graph data structure includes a weighted graph data structure, the weighted graph data structure weighted in accord with an obligation quantity for each of the obligations.

4. The computer-implemented method of claim 1, wherein the graph data structure includes a weighted graph data structure, the weighted graph data structure weighted in accord with an obligation delivery date for each of the obligations.

5. The computer-implemented method of claim 1, wherein traversing the portfolio data structure iteratively by vertex includes generating a path matrix tracking iterative traversal of the portfolio data structure.

6. The computer-implemented method of claim 5, wherein the path matrix indicates which of the vertices have been analyzed in previous iterations.

7. The computer-implemented method of claim 5, wherein the path matrix indicates when all circular paths including a particular vertex of the vertices have been traversed.

8. Non-transitory computer-readable media including instructions stored on the non-transitory computer-readable media, the instructions configured to, when executed, cause a first processor to:

access a portfolio data structure, the portfolio data structure including data records of obligations between a plurality of participants, the data records of obligations including edges between vertices within a graph data structure, the first processor including an architecture specialized for matrix operations; and traverse the portfolio data structure iteratively by vertex to identify a plurality of paths from a first vertex, at each iteration placing an identified path in a processing stack;

the instructions further configured to cause a second processor different from the first to:

determine that no more unvisited vertices from the first vertex exist, popping the first vertex from a processing queue for the processor;

determine an optimized notional for each of the plurality of paths;

determine, for each of the plurality of paths in the processing stack, a respective proposed transaction that creates a circular obligation for the path with the optimized notional;

sort the plurality of proposed transactions based on a first predetermined parameter to apply prioritization to the proposed transactions;

select, based on the prioritization of the proposed transactions, a top priority transaction;

prioritize generation of an update message identifying top priority transaction regardless of the maximum notional value determined for any identified circular path elsewhere within the portfolio data structure;

generate the update message; and send, via an electronic communications network, the update message to at least a first participant with an obligation to be altered by the top priority transaction.

9. The non-transitory computer-readable media of claim 8, wherein the predetermined parameter includes a length of the circular obligation for the corresponding proposed transaction and/or a user-defined parameter.

10. The non-transitory computer-readable media of claim 8, wherein the graph data structure includes a weighted graph data structure, the weighted graph data structure weighted in accord with an obligation quantity for each of the obligations.

11. The non-transitory computer-readable media of claim 8, wherein the graph data structure includes a weighted graph data structure, the weighted graph data structure weighted in accord with an obligation delivery date for each of the obligations.

12. The non-transitory computer-readable media of claim 8, wherein the instructions are further configured to cause the first processor to traverse the portfolio data structure iteratively by generating a path matrix tracking iterative traversal of the portfolio data structure.

13. The non-transitory computer-readable media of claim 12, wherein the path matrix is configured to indicate which of the vertices have been analyzed in previous iterations.

14. An electronic trading system including:

a first processor the first processor including an architecture specialized for matrix operations;

a second processor; and memory configured to store:

first instructions configured to cause the first processor to access, via at least a portfolio data structure, the portfolio data structure including data records of obligations between a plurality of participants, the data records of obligations including edges between vertices within a graph data structure;

second instructions configured to cause the first processor to traverse the portfolio data structure iteratively by vertex to identify a plurality of paths from a first vertex, at each iteration placing an identified path in a processing stack;

third instructions configured to cause the second processor to determine that no more unvisited vertices from the first vertex exist, popping the first vertex from a processing queue for the processor;

fourth instructions configured to cause the second processor to determine an optimized notional for each of the plurality of paths;

fifth instructions configured to cause the second processor to determine, for each of the plurality of paths in the processing stack, a respective proposed transaction that creates a circular obligation for the path with the optimized notional;

sixth instructions configured to cause the second processor to sort the plurality of proposed transactions based on a first predetermined parameter to apply prioritization to the proposed transactions;

seventh instructions configured to cause the second processor to select, based on the prioritization of the proposed transactions, a top priority transaction;

eighth instructions configured to cause the second processor to prioritize, generation of an update message identifying top priority transaction regardless of the maximum notional value determined for any identified circular path elsewhere within the portfolio data structure;

ninth instructions configured to cause the second processor to generate the update message; and tenth instructions configured to cause the second processor send, via an electronic communications network, the update message to at least a first participant with an obligation to be altered by the top priority transaction.

15. The electronic trading system of claim 14, wherein the predetermined parameter includes a length of the circular obligation for the corresponding proposed transaction and/or a user-defined parameter.

16. The electronic trading system of claim 14, wherein the graph data structure includes a weighted graph data structure, the weighted graph data structure weighted in accord with an obligation quantity for each of the obligations.

17. The electronic trading system of claim 14, wherein the graph data structure includes a weighted graph data structure, the weighted graph data structure weighted in accord with an obligation delivery date for each of the obligations.

18. The electronic trading system of claim 14, wherein the second instructions are further configured to cause the first processor to traverse the portfolio data structure iteratively by vertex includes generating a path matrix tracking iterative traversal of the portfolio data structure.

19. The electronic trading system of claim 14, wherein the path matrix indicates which of the vertices have been analyzed in previous iterations.

20. The electronic trading system of claim 19, wherein the path matrix indicates when all circular paths including a particular vertex of the vertices have been traversed.

* * * * *